United States Patent
Jonnalagadda et al.

(10) Patent No.: US 11,551,188 B2
(45) Date of Patent: Jan. 10, 2023

(54) SYSTEMS AND METHODS FOR IMPROVED AUTOMATED CONVERSATIONS WITH ATTENDANT ACTIONS

(71) Applicant: Conversica, Inc., Foster City, CA (US)

(72) Inventors: Siddhartha Reddy Jonnalagadda, Bothell, WA (US); George Alexis Terry, Woodside, CA (US); James D. Harriger, Duvall, WA (US); Werner Koepf, Seattle, WA (US); William Dominic Webb-Purkis, San Francisco, CA (US); Macgregor S. Gainor, Bellingham, WA (US); Patrick D. Griffin, Bellingham, WA (US)

(73) Assignee: CONVERSICA, INC., Foster City, CA (US)

( * ) Notice: Subject to any disclaimer, the term of this patent is extended or adjusted under 35 U.S.C. 154(b) by 762 days.

(21) Appl. No.: 16/536,083

(22) Filed: Aug. 8, 2019

(65) Prior Publication Data
US 2020/0034797 A1     Jan. 30, 2020

Related U.S. Application Data

(63) Continuation-in-part of application No. 16/019,382, filed on Jun. 26, 2018, now Pat. No. 11,301,632, (Continued)

(51) Int. Cl.
*G06F 40/56*     (2020.01)
*H04L 51/02*     (2022.01)
(Continued)

(52) U.S. Cl.
CPC ....... *G06Q 10/1095* (2013.01); *G06F 16/358* (2019.01); *G06F 40/56* (2020.01); *H04L 51/02* (2013.01)

(58) Field of Classification Search
CPC ... G06Q 10/1095; G06F 16/358; G06F 40/56; H04L 51/02; H04L 51/046
See application file for complete search history.

(56) References Cited

U.S. PATENT DOCUMENTS

| | | |
|---|---|---|
| 7,076,430 B1 | 7/2006 | Cosatto et al. |
| 7,275,083 B1 | 9/2007 | Seibel et al. |
| | (Continued) | |

FOREIGN PATENT DOCUMENTS

EP     3467755     4/2019

OTHER PUBLICATIONS

Quote Wizard & Ava.Ai Unveil Automated Virtual Assistant for Insurance Agents Jun. 20, 2014. Insurance Weekly News (Year: 2014).
(Continued)

*Primary Examiner* — Soe Hlaing
(74) *Attorney, Agent, or Firm* — Kang S. Lim

(57) ABSTRACT

Systems and methods for scheduling appointments are provided. This scheduling process includes generating an introductory message proposing an appointment with the target with a request for timing. The target responds, and this response is processed for a positive interest and the presence of a proposed time. If there is an absence of positive interest then the messaging may be discontinued. However, in the presence of a positive interest, and a proposed time from the target, the system may access an external scheduling system when a proposed time is present. This includes determining availability of at least one resource at the proposed time. The system then iteratively provides suggested times close to the proposed time when the resource is not available for the proposed time. The system then confirms the appointment when the resource is available for either the proposed time or any of the suggested times.

11 Claims, 28 Drawing Sheets

Related U.S. Application Data which is a continuation-in-part of application No. 14/604,594, filed on Jan. 23, 2015, now Pat. No. 10,803,479, and a continuation-in-part of application No. 14/604,602, filed on Jan. 23, 2015, now Pat. No. 11,042,910, and a continuation-in-part of application No. 14/604,610, filed on Jan. 23, 2015, now Pat. No. 10,026,037.

(60) Provisional application No. 62/807,684, filed on Feb. 19, 2019, provisional application No. 62/720,245, filed on Aug. 21, 2018, provisional application No. 62/719,968, filed on Aug. 20, 2018, provisional application No. 62/561,194, filed on Sep. 20, 2017.

(51) Int. Cl.
*G06Q 10/10* (2012.01)
*G06F 16/35* (2019.01)

(56) References Cited

U.S. PATENT DOCUMENTS

| | | | |
|---|---|---|---|
| 7,512,580 | B2 | 3/2009 | Ronnewinkel |
| 8,000,973 | B2 | 8/2011 | Williams et al. |
| 8,099,316 | B2 | 1/2012 | Moukas et al. |
| 8,364,467 | B1 | 1/2013 | Bowman et al. |
| 8,666,742 | B2 | 3/2014 | Detlef et al. |
| 8,694,355 | B2 | 4/2014 | Bui et al. |
| 8,700,543 | B2 | 4/2014 | Glickman |
| 8,738,739 | B2 | 5/2014 | Makar |
| 8,767,948 | B1 | 7/2014 | Riahi |
| 8,787,553 | B2 | 7/2014 | Fan et al. |
| 9,258,423 | B1 | 2/2016 | Beall |
| 9,367,814 | B1 | 6/2016 | Lewis et al. |
| 9,552,591 | B2 | 1/2017 | Barak et al. |
| 9,805,018 | B1 | 10/2017 | Richfield |
| 10,043,205 | B2 | 8/2018 | Gupta et al. |
| 2005/0080613 | A1 | 4/2005 | Colledge et al. |
| 2007/0036334 | A1 | 2/2007 | Culbertson et al. |
| 2007/0129993 | A1 | 6/2007 | Alvin |
| 2007/0233692 | A1 | 10/2007 | Lisa et al. |
| 2008/0071606 | A1 | 3/2008 | Whiteley et al. |
| 2009/0048859 | A1 | 2/2009 | McCarthy et al. |
| 2010/0010885 | A1 | 1/2010 | Hill et al. |
| 2011/0060643 | A1 | 3/2011 | Davis et al. |
| 2011/0238435 | A1* | 9/2011 | Rapaport ............... G06Q 10/10 705/2 |
| 2012/0191546 | A1 | 7/2012 | Phelan |
| 2012/0245925 | A1 | 9/2012 | Guha |
| 2013/0046531 | A1 | 2/2013 | Chandramouli |
| 2013/0086188 | A1 | 4/2013 | Mays et al. |
| 2013/0297442 | A1 | 11/2013 | Simons et al. |
| 2013/0346067 | A1 | 12/2013 | Bhatt |
| 2014/0122407 | A1 | 5/2014 | Duan |
| 2014/0149161 | A1 | 5/2014 | Hedges |
| 2014/0164525 | A1* | 6/2014 | Malik .................... H04L 51/02 709/204 |
| 2014/0195354 | A1 | 7/2014 | Pokonosky |
| 2014/0222854 | A1 | 8/2014 | Lee et al. |
| 2014/0229218 | A1* | 8/2014 | Abuelsaad ......... G06Q 10/1095 705/7.19 |
| 2014/0278958 | A1 | 9/2014 | Nukala et al. |
| 2014/0279050 | A1 | 9/2014 | Makar et al. |
| 2014/0280184 | A1 | 9/2014 | Swaminathan et al. |
| 2014/0280225 | A1 | 9/2014 | Southern-Boukerrou |
| 2014/0280623 | A1 | 9/2014 | Duan |
| 2014/0288920 | A1 | 9/2014 | Proux |
| 2015/0019305 | A1 | 1/2015 | Gorawala |
| 2015/0100364 | A1 | 4/2015 | Friedman et al. |
| 2015/0269697 | A1* | 9/2015 | Rivera de la Vega .. H04W 4/12 705/2 |
| 2015/0348548 | A1 | 12/2015 | Piernot |
| 2015/0350144 | A1 | 12/2015 | Zeng et al. |
| 2015/0365527 | A1 | 12/2015 | Chakravarthy |
| 2016/0071117 | A1 | 3/2016 | Duncan |
| 2016/0125364 | A1 | 5/2016 | Field et al. |
| 2016/0217500 | A1 | 7/2016 | Brigham et al. |
| 2017/0236097 | A1* | 8/2017 | Smith ................ G06Q 10/1095 705/7.19 |

OTHER PUBLICATIONS

Artificial Intelligence-Based Email Conversations Shown to Quadruple Lead Engagement for more Effective Sales and Marketing Campigns Jun. 5, 2014, NASDAQ OMX's News Release Distribution Channel (Year: 2014).

Artificial Intelligence Comes to Your Email; Artificial Life Releases New Intelligent Email Module, Mar. 27, 2002, Business Wire (Year: 2002).

USPTO, ISA/US, "Notification of Transmittal of the ISR and the WO of the International Searching Authority or the Declaration", in PCT Application No. PCT/US2016/014650, dated May 6, 2016, 12 pages.

USPTO, ISA/US, "Notification of Transmittal of the ISR and the WO of the International Searching Authority or the Declaration", in PCT Application No. PCT/US2018/051827, dated Feb. 5, 2019, 10 pages.

\* cited by examiner

SYSTEMS AND METHODS FOR IMPROVED AUTOMATED CONVERSATIONS WITH ATTENDANT ACTIONS

CROSS REFERENCE TO RELATED APPLICATIONS

This continuation-in-part application is a non-provisional and claims the benefit of three U.S. provisional application No. 62/719,968, filed in the USPTO on Aug. 20, 2018, No. 62/720,245, filed in the USPTO on Aug. 21, 2018, and No. 62/807,684, filed in the USPTO on Feb. 19, 2019, all of the same title as this application.

This continuation-in-part application also claims the benefit of U.S. application entitled "Systems and Methods for Natural Language Processing and Classification," U.S. application Ser. No. 16/019,382, filed in the USPTO on Jun. 26, 2018, which is a non-provisional of U.S. provisional application No. 62/561,194, filed in the USPTO on Sep. 20, 2017, of the same title. U.S. application Ser. No. 16/019,382 also is a continuation-in-part application which claims the benefit of U.S. application entitled "Systems and Methods for Configuring Knowledge Sets and AI Algorithms for Automated Message Exchanges," U.S. application Ser. No. 14/604,610, filed in the USPTO on Jan. 23, 2015, now U.S. Pat. No. 10,026,037 issued Jul. 17, 2018. Additionally, U.S. application Ser. No. 16/019,382 claims the benefit of U.S. application entitled "Systems and Methods for Processing Message Exchanges Using Artificial Intelligence," U.S. application Ser. No. 14/604,602, filed in the USPTO on Jan. 23, 2015, and U.S. application entitled "Systems and Methods for Management of Automated Dynamic Messaging," U.S. application Ser. No. 14/604,594, filed in the USPTO on Jan. 23, 2015.

All of the above-listed applications and patents are incorporated herein in their entirety by this reference.

BACKGROUND

The present invention relates to systems and methods for natural language processing and generation of more "human" sounding artificially generated conversations with attendant actions resulting from therefrom. Such natural language processing techniques may be employed in the context of machine learned conversation systems. These conversational AIs include, but are not limited to, message response generation, AI assistant performance, and other language processing, primarily in the context of the generation and management of a dynamic conversations. Such systems and methods provide a wide range of business people more efficient tools for outreach, knowledge delivery, automated task completion, and also improve computer functioning as it relates to processing documents for meaning. In turn, such system and methods enable more productive business conversations and other activities with a majority of tasks performed previously by human workers delegated to artificial intelligence assistants.

Artificial Intelligence (AI) is becoming ubiquitous across many technology platforms. AI enables enhanced productivity and enhanced functionality through "smarter" tools. Examples of AI tools include stock managers, chatbots, and voice activated search-based assistants such as Siri and Alexa. With the proliferation of these AI systems, however, come challenges for user engagement, quality assurance and oversight.

When it comes to user engagement, many people do not feel comfortable communicating with a machine outside of certain discrete situations. A computer system intended to converse with a human is typically considered limiting and frustrating. This has manifested in a deep anger many feel when dealing with automated phone systems, or spammed, non-personal emails.

These attitudes persist even when the computer system being conversed with is remarkably capable. For example, many personal assistants such as Siri and Alexa include very powerful natural language processing capabilities; however, the frustration when dealing with such systems, especially when they do not "get it" persists. Ideally an automated conversational system provides more organic sounding messages in order to reduce this natural frustration on behalf of the user. Indeed, in the perfect scenario, the user interfacing with the AI conversation system would be unaware that they are speaking with a machine rather than another human.

In order for a machine to sound more human or organic includes not only improvements in natural language processing, but additionally the ability to take additional actions in response to the conversation outcomes.

It is therefore apparent that an urgent need exists for advancements in the natural language processing techniques used by AI conversation systems, and the ability to take actions based upon these conversations. Such systems and methods allow for improved conversations and for added functionalities.

SUMMARY

To achieve the foregoing and in accordance with the present invention, systems and methods for improved natural language processing are provided. Such systems and methods allow for more effective AI operations, improvements to the experience of a conversation target, and increased productivity through AI assistance.

In some embodiments, systems and methods are provided for scheduling used in a conversation between a target and an Artificial Intelligence (AI) messaging system. This scheduling process includes generating an introductory message proposing an appointment with the target with a request for timing. The target responds, and this response is processed for a positive interest and the presence of a proposed time.

Based upon the analysis of the response, different actions may be taken. For example, if there is an absence of positive interest then the messaging may be discontinued. However, in the presence of a positive interest, and a proposed time from the target, the system may access an external scheduling system when a proposed time is present. This includes determining availability of at least one resource at the proposed time.

The system then iteratively provides suggested times close to the proposed time when the resource is not available for the proposed time. The system then confirms the appointment when the resource is available for either the proposed time or any of the suggested times.

The output of the AI messaging system is presented as a dashboard for end-users. The dashboard explains how the AI messaging system makes decisions, and allows companies using the AI messaging system to fine-tune the behavior of their AI assistant. The output of the AI messaging system is extended to a feature that allows users to directly teach their assistant new ways of conversing with prospects.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
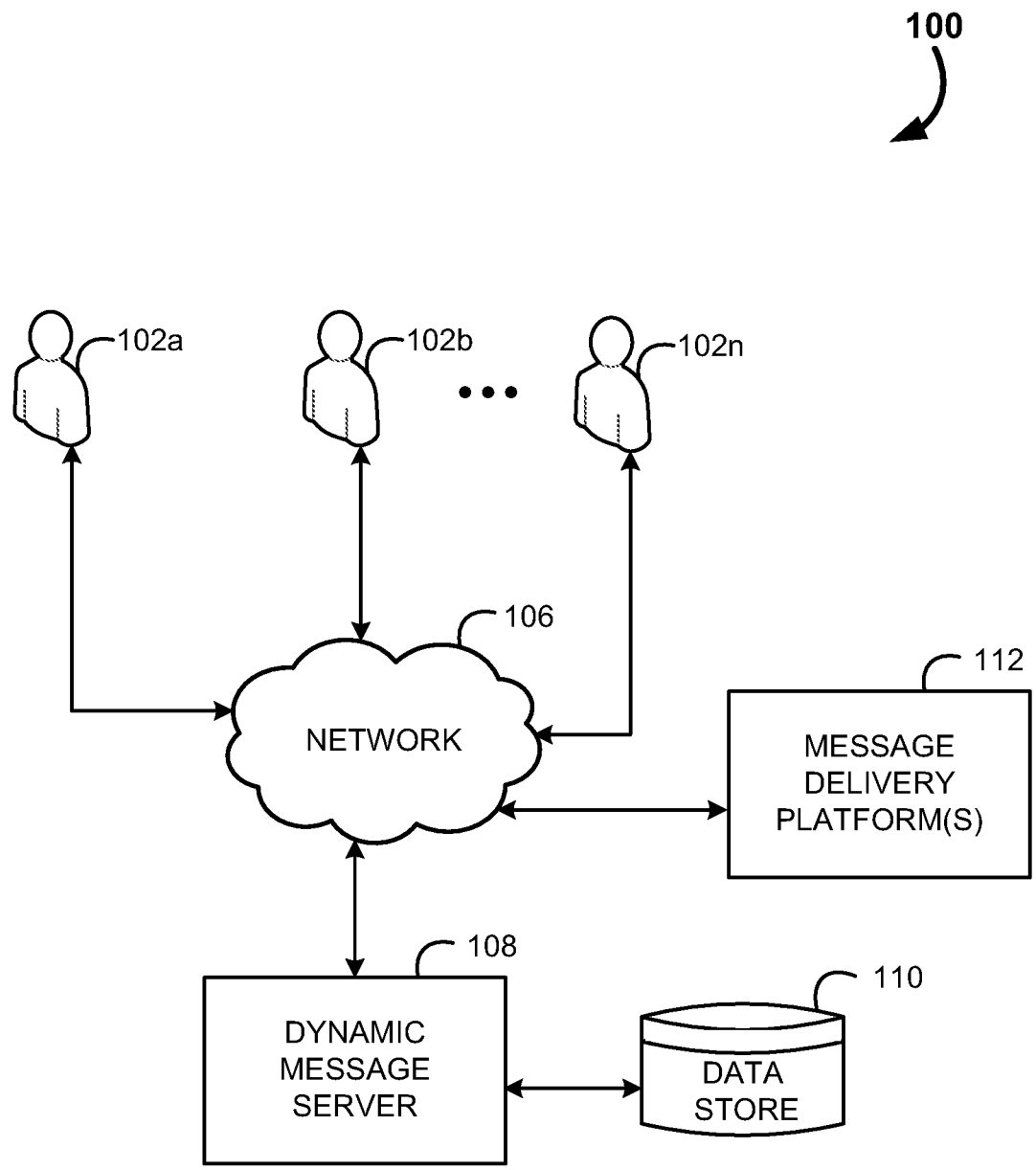
FIG. 1 is an example logical diagram of a system for generation and implementation of messaging conversations, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to enhancements to traditional natural language processing techniques and subsequent actions taken by an automated system. While such systems and methods may be utilized with any AI system, such natural language processing particularly excel in AI systems relating to the generation of automated messaging for business conversations such as marketing and other sales functions. While the following disclosure is applicable for other combinations, we will focus upon natural language processing in AI marketing systems as an example, to demonstrate the context within which the enhanced natural language processing excels.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for improvements in natural language processing and actions taken in response to such message exchanges, within conversation systems, and for employment of domain specific assistant systems that leverage these enhanced natural language processing techniques. The goal of the message conversations is to enable a logical dialog exchange with a recipient, where the recipient is not necessarily aware that they are communicating with an automated machine as opposed to a human user. This may be most efficiently performed via a written dialog, such as email, text messaging, chat, etc. However, given the advancement in audio and video processing, it may be entirely possible to have the dialog include audio or video components as well.

In order to effectuate such an exchange, an AI system is employed within an AI platform within the messaging system to process the responses and generate conclusions regarding the exchange. These conclusions include calculating the context of a document, intents, entities, sentiment and confidence for the conclusions. Human operators, through a "training desk" interface, cooperate with the AI to ensure as seamless an experience as possible, even when the AI system is not confident or unable to properly decipher a message. The natural language techniques disclosed herein assist in making the outputs of the AI conversation system more effective, and more 'human sounding', which may be preferred by the recipient/target of the conversation.

I. Dynamic Messaging Systems with Enhanced Natural Language Processing

To facilitate the discussion, FIG. 1 is an example logical diagram of a system for generating and implementing messaging conversations, shown generally at 100. In this example block diagram, several users 102*a-n* are illustrated engaging a dynamic messaging system 108 via a network 106. Note that messaging conversations may be uniquely customized by each user 102*a-n* in some embodiments. In alternate embodiments, users may be part of collaborative sales departments (or other collaborative group) and may all have common access to the messaging conversations. The users 102*a-n* may access the network from any number of suitable devices, such as laptop and desktop computers, work stations, mobile devices, media centers, etc.

The network 106 most typically includes the internet but may also include other networks such as a corporate WAN, cellular network, corporate local area network, or combination thereof, for example. The messaging server 108 may distribute the generated messages to the various message delivery platforms 112 for delivery to the individual recipients. The message delivery platforms 112 may include any suitable messaging platform. Much of the present disclosure will focus on email messaging, and in such embodiments the message delivery platforms 112 may include email servers (Gmail, Yahoo, Outlook, etc.). However, it should be realized that the presently disclosed systems for messaging are not necessarily limited to email messaging. Indeed, any messaging type is possible under some embodiments of the present messaging system. Thus, the message delivery platforms 112 could easily include a social network interface, instant messaging system, text messaging (SMS) platforms, or even audio or video telecommunications systems.

One or more data sources 110 may be available to the messaging server 108 to provide user specific information, message template data, knowledge sets, intents, and target information. These data sources may be internal sources for the system's utilization or may include external third-party data sources (such as business information belonging to a customer for whom the conversation is being generated). These information types will be described in greater detail below. This information may be leveraged, in some embodiments, to generate a profile regarding the conversation target. A profile for the target may be particularly useful in a sales setting where differing approaches may yield dramatically divergent outcomes. For example, if it is known that the target is a certain age, with young children, and with an income of $75,000 per year, a conversation assistant for a car dealership will avoid presenting the target with information about luxury sports cars, and instead focus on sedans, SUVs and minivans within a budget the target is likely able to afford. By engaging the target with information relevant to them, and sympathetic to their preferences, the goals of any given conversation are more likely to be met. The external data sources typically relied upon to build out a target profile may include, but are not limited to, credit applications, CRM data sources, public records data sets, loyalty programs, social media analytics, and other "pay to play" data sets, for example.

The other major benefit of a profile for the target is that data that the system "should know" may be incorporated into the conversation to further personalize the message exchange. Information the system "should know" is data that is evident trough the exchange, or the target would expect the AI system would know. Much of the profile data may be public, but a conversation target would feel strange (or even violated) to know that the other party they are communicating with has such a full set of information regarding them. For example, a consumer doesn't typically assume a retailer knows how they voted in the last election, but through an AI conversational system with access to third party data sets, this kind of information may indeed be known. Bringing up such knowledge in a conversation exchange would strike the target as strange, at a minimum, and may actually interfere with achieving the conversation objectives. In contrast, offered information, or information the target assumes the other party has access to, can be incorporated into the conversation in a manner that personalizes the exchange, and makes the conversation more organic sounding. For example if the target mentions having children, and is engaging an AI system deployed for an automotive dealer, a very natural message exchange could include "You mentioned wanting more information on the Highlander SUV. We have a number in stock, and one of our sales reps would love to show you one and go for a test drive. Plus they are great for families. I'm sure your kids would love this car."

Figure 2:
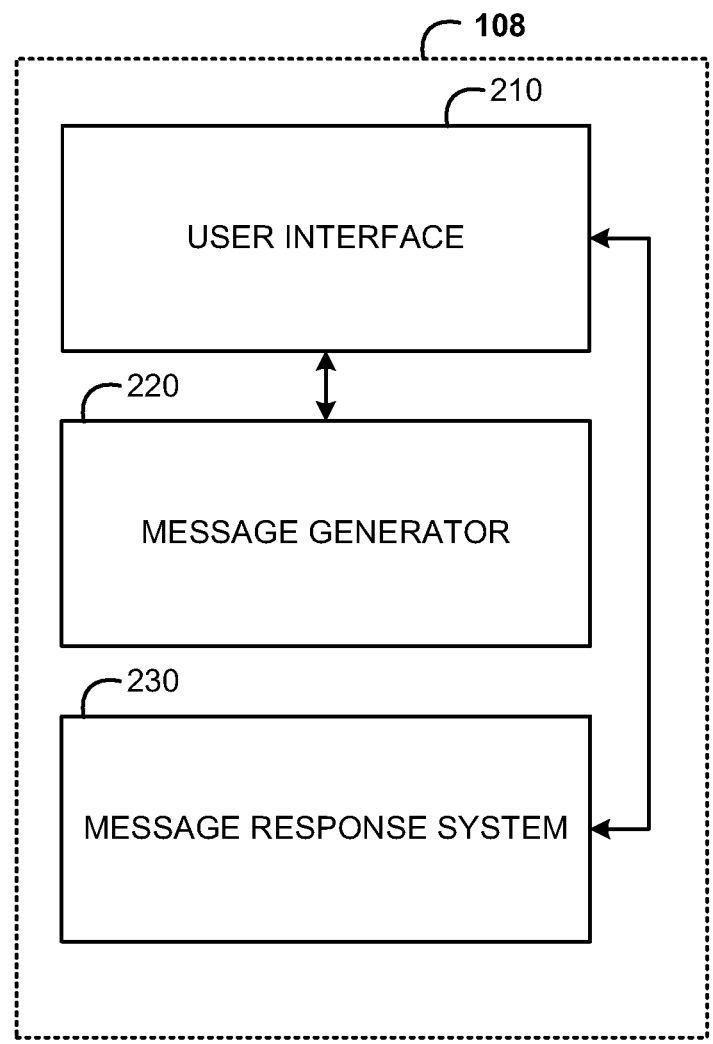
FIG. 2 is an example logical diagram of a dynamic messaging server, in accordance with some embodiment.

Moving on, FIG. 2 provides a more detailed view of the dynamic messaging server 108, in accordance with some embodiment. The server is comprised of three main logical subsystems: a user interface 210, a message generator 220, and a message response system 230. The user interface 210 may be utilized to access the message generator 220 and the message response system 230 to set up messaging conversations and manage those conversations throughout their life cycle. At a minimum, the user interface 210 includes APIs to allow a user's device to access these subsystems. Alternatively, the user interface 210 may include web accessible messaging creation and management tools.

Figure 3:
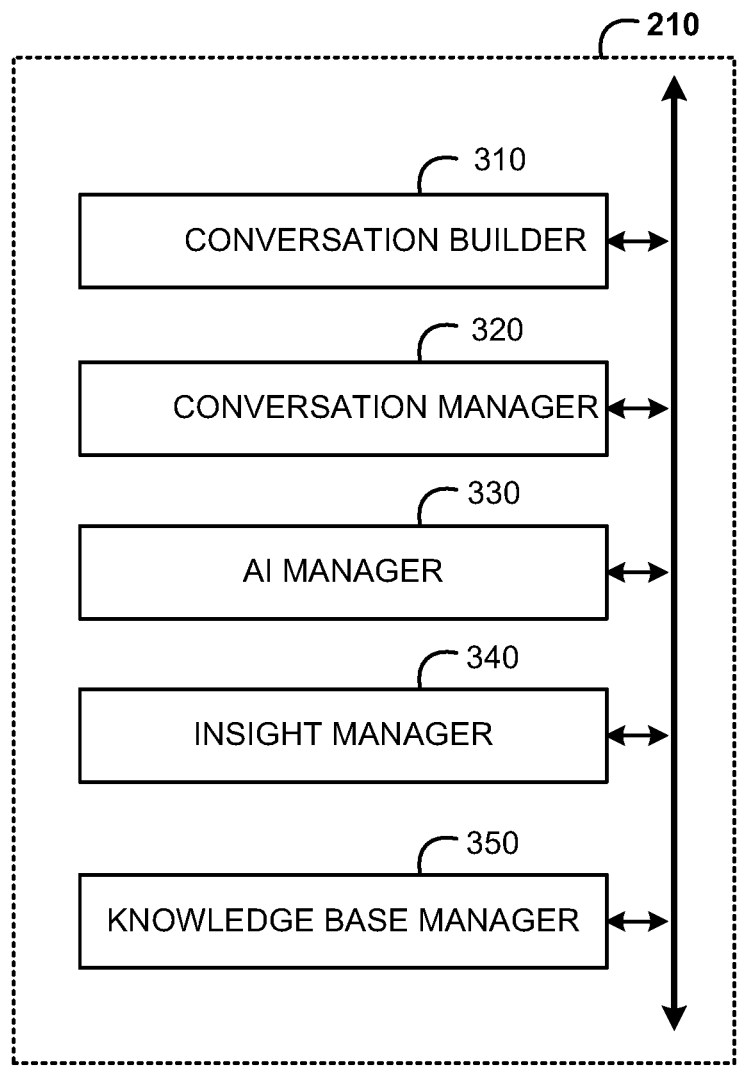
FIG. 3 is an example logical diagram of a user interface within the dynamic messaging server, in accordance with some embodiment.

FIG. 3 provides a more detailed illustration of the user interface 210. The user interface 210 includes a series of modules to enable the previously mentioned functions to be carried out in the message generator 220 and the message response system 230. These modules include a conversation builder 310, a conversation manager 320 an AI manager 330, an intent manager 340, and a knowledge base manager 350.

The conversation builder 310 allows the user to define a conversation, and input message templates for each series/exchange within the conversation. A knowledge set and target data may be associated with the conversation to allow the system to automatically effectuate the conversation once built. Target data includes all the information collected on the intended recipients, and the knowledge set includes a database from which the AI can infer context and perform classifications on the responses received from the recipients.

The conversation manager 320 provides activity information, status, and logs of the conversation once it has been implemented. This allows the user 102a to keep track of the conversation's progress, success and allows the user to manually intercede if required. The conversation may likewise be edited or otherwise altered using the conversation manager 320.

The AI manager 330 allows the user to access the training of the artificial intelligence which analyzes responses received from a recipient. One purpose of the given systems and methods is to allow very high throughput of message exchanges with the recipient with relatively minimal user input. To perform this correctly, natural language processing by the AI is required, and the AI (or multiple AI models) must be correctly trained to make the appropriate inferences and classifications of the response message. The user may leverage the AI manager 330 to review documents the AI has processed and has made classifications for.

In some embodiments, the training of the AI system may be enabled by, or supplemented with, conventional CRM data. The existing CRM information that a business has compiled over years of operation is incredibly rich in detail, and specific to the business. As such, by leveraging this existing data set the AI models may be trained in a manner that is incredibly specific and valuable to the business. CRM data may be particularly useful when used to augment traditional training sets, and input from the training desk. Additionally, social media exchanges may likewise be useful as a training source for the AI models. For example, a business often engages directly with customers on social media, leading to conversations back and forth that are again, specific and accurate to the business. As such this data may also be beneficial as a source of training material.

The intent manager 340 allows the user to manage intents. As previously discussed, intents are a collection of categories used to answer some question about a document. For example, a question for the document could include "is the lead looking to purchase a car in the next month?" Answering this question can have direct and significant importance to a car dealership. Certain categories that the AI system generates may be relevant toward the determination of this question. These categories are the 'intent' to the question and may be edited or newly created via the intent manager 340.

In a similar manner, the knowledge base manager 350 enables the management of knowledge sets by the user. As discussed, a knowledge set is a set of tokens with their associated category weights used by an aspect (AI algorithm) during classification. For example, a category may include "continue contact?", and associated knowledge set tokens could include statements such as "stop", "do no contact", "please respond" and the like.

Figure 4:
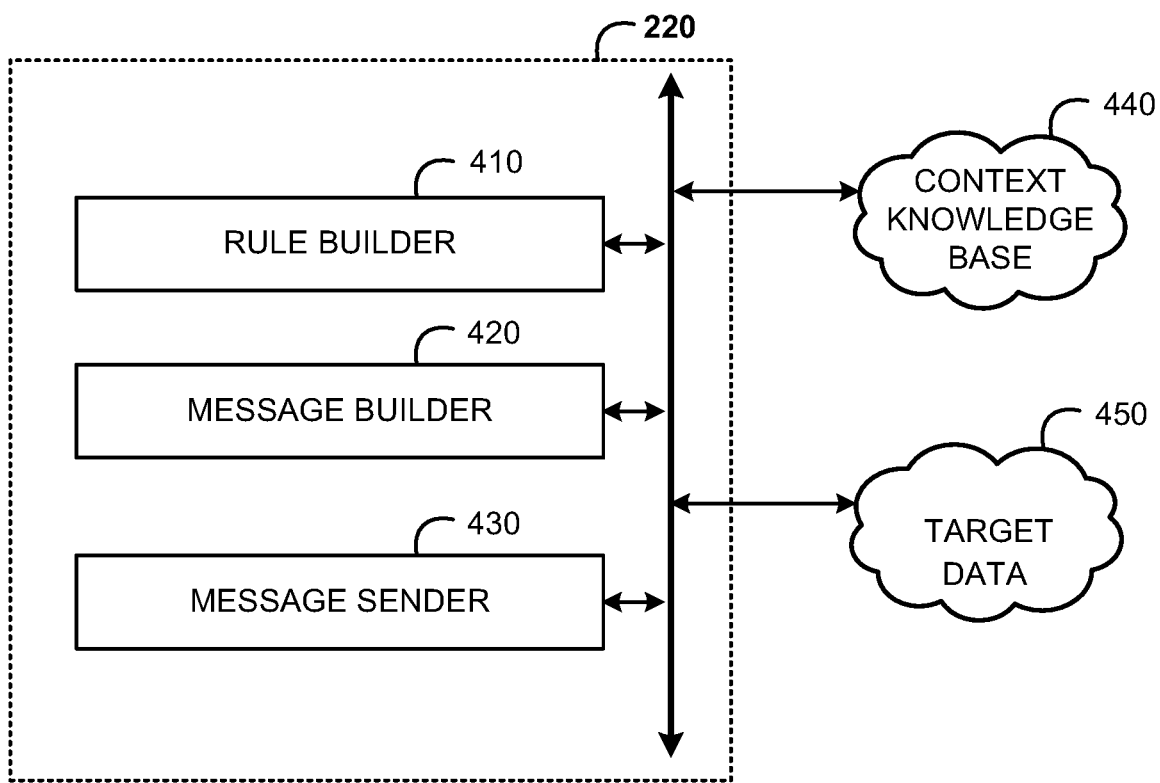
FIG. 4 is an example logical diagram of a message generator within the dynamic messaging server, in accordance with some embodiment.

Moving on to FIG. 4, an example logical diagram of the message generator 220 is provided. The message generator 220 utilizes context knowledge 440 and target data 450 to generate the initial message. The message generator 220 includes a rule builder 410 which allows the user to define rules for the messages. A rule creation interface which allows users to define a variable to check in a situation and then alter the data in a specific way. For example, when receiving the scores from the AI, if the intent is Interpretation and the chosen category is 'good', then have the Continue Messaging intent return 'continue'.

The rule builder 410 may provide possible phrases for the message based upon available target data. The message builder 420 incorporates those possible phrases into a message template, where variables are designated, to generate the outgoing message. Multiple selection approaches and algorithms may be used to select specific phrases from a large phrase library of semantically similar phrases for inclusion into the message template. For example, specific phrases may be assigned category rankings related to various dimensions such as "formal vs. informal, education level, friendly tone vs. unfriendly tone, and other dimensions". Additional category rankings for individual phrases may also be dynamically assigned based upon operational feedback in achieving conversational objectives so that more "successful" phrases may be more likely to be included in a particular message template. Phrase package selection will be discussed in further detail below. The selected phrases incorporated into the template message is provided to the message sender 430 which formats the outgoing message and provides it to the messaging platforms for delivery to the appropriate recipient.

Feedback may be collected from the conversational exchanges, in many embodiments. For example if the goal of a given message exchange is to set up a meeting, and the target agrees to said meeting, this may be counted as successful feedback. However, it may also be desirable to collect feedback from external systems, such as transaction logs in a point of sales system, or through records in a CRM system.

Figure 5A:
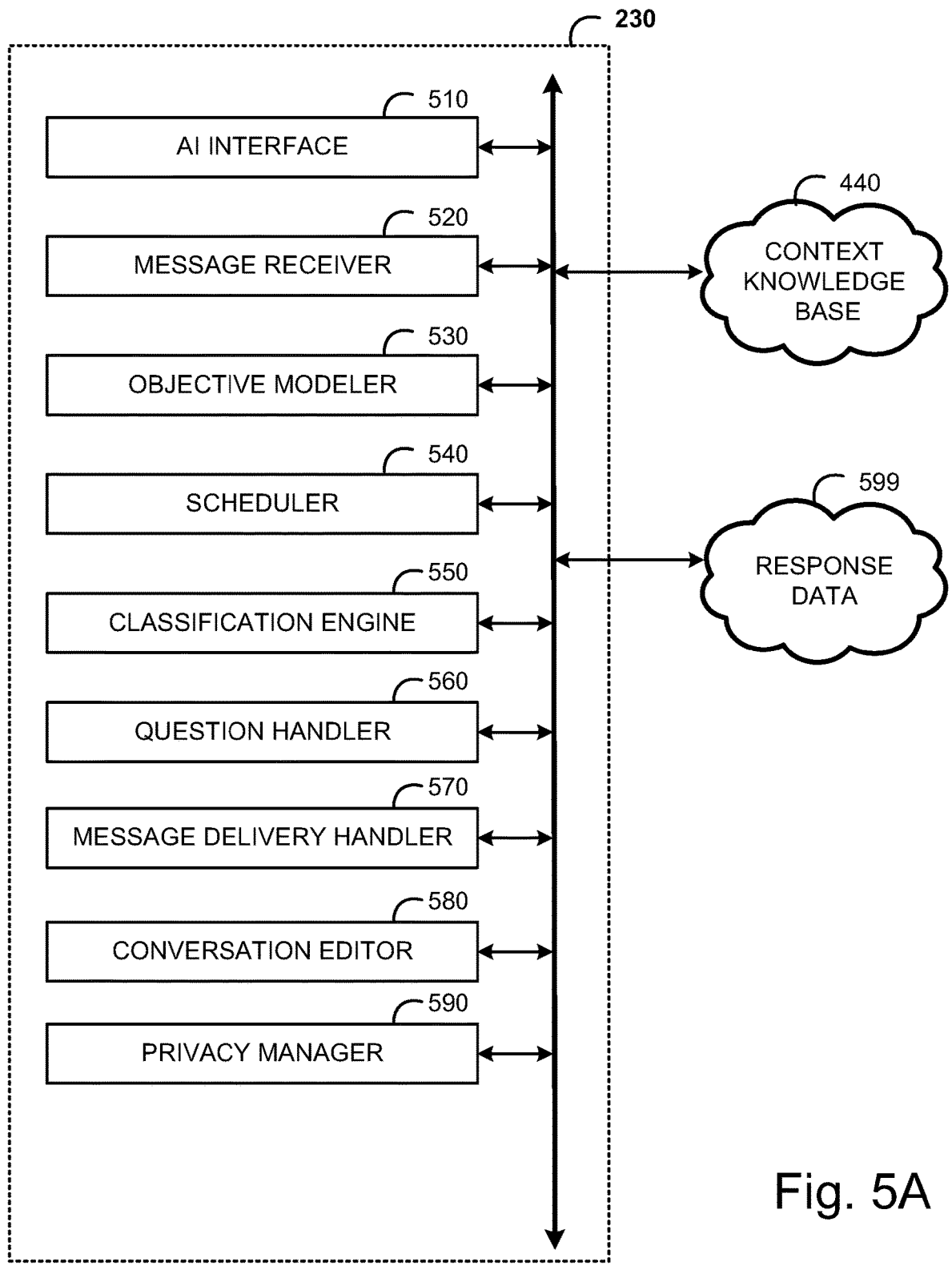
FIG. 5A is an example logical diagram of a message response system within the dynamic messaging server, in accordance with some embodiment.

FIG. 5A is an example logical diagram of the message response system 230. In this example system, the contextual knowledge base 440 is utilized in combination with response data 599 received from the person being messaged (the target or recipient). The message receiver 520 receives the response data 599 and provides it to the AI interface 510, objective modeler 530, and classifier engine 550 for feedback. The AI interface 510 allows the AI platform (or multiple AI models) to process the response for context, intents, sentiments and associated confidence scores. The classification engine 550 includes a suite of tools that enable better classification of the messages using machine learned models. Based on the classifications generated by the AI and classification engine 550 tools target objectives may be updated by the objective modeler 530 and/or the question handler 560 (if the response includes a question). The objective modeler may indicate what the objective to the next action in the conversation may entail.

The dynamic messager 560 then formulates a response based upon the classification and objectives. Unlike traditional response systems, the dynamic messager 560 allows for more varied responses through variable selection that takes into account success prediction and personality mimicry, as well as advanced actions not typically associated with an AI system. The result is a response that is more natural and 'organic' sounding and action rich, yet composed in a manner most likely to effectuate a particular reaction form the recipient.

The message delivery handler 570 enables not only the delivery of the generated responses, but also may effectuate the additional actions beyond mere response delivery. The message delivery handler 570 may include phrase selections, contextualizing the response by historical activity, through language selection, and execute additional actions like status updates, appointment setting, and the like. A scheduler 540 may determine when and how to deliver a given message or execute a given action.

A conversation editor interface 580 may enable a user of the system to readily understand how the model operates at any given node, and further enables the alteration of how the system reacts to given inputs. The conversation editor 580 may also generate and display important metrics that may assist the user in determining if, and how, a given node should be edited. For example, for a given action at the node, the system may indicate how often that action has been utilized in the past, or how often the message if referred to the training desk due to the model being unclear on how to properly respond. Importantly, the conversation editor 580 may also enable a user of the system to configure AI assistants and manage the personality type for such an assistant. In some embodiments, a particular AI assistant's 'personality' may in fact be learned through successful conversational exchanges. Thus if the AI system determines 'sassy' responses are more frequently successful at a given stage in a conversation series, future messages may adopt this personality type moving forward.

Additional metrics for a given model may also be desirable to track. For example the usage level of a given model may be important to track. Models used extensively may be afforded greater weight in their classifications, whereas underutilized models may elicit a flag for review. If a model is not being used and obsolete, it may be desirable to merely remove the model, thereby improving processing requirements for a conversation, or modify the model to be useful.

For any external reporting or displays by the conversation editor the data may be subject to privacy regulations or other privacy policies. Responsive to these concerns a privacy manager 590 may extract and categorize data to avoid violating any laws or policies.

Figure 5B:
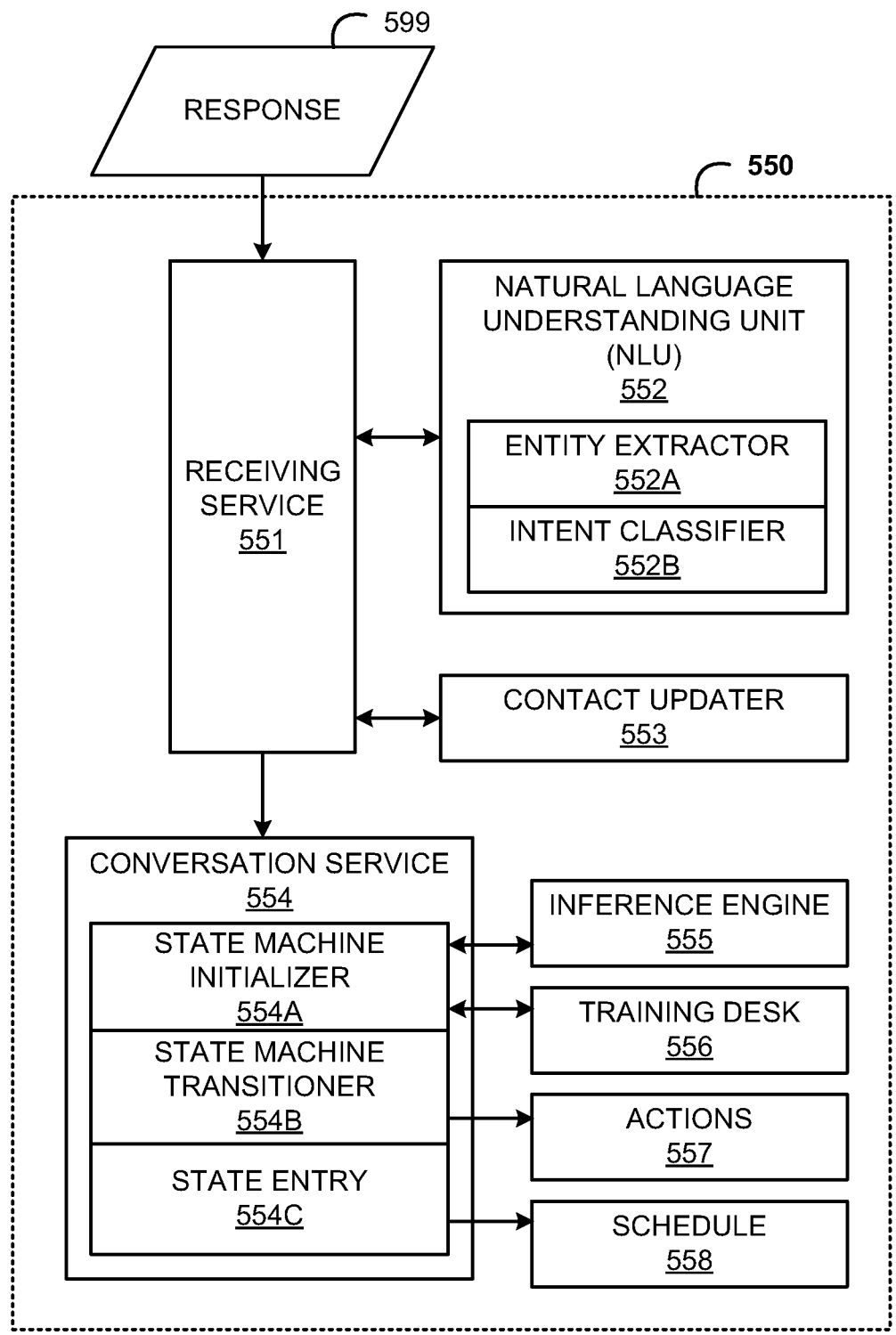
FIG. 5B is an example logical diagram of a classification engine, in accordance with some embodiment.

Turning to FIG. 5B, the classification engine 550 is provided in greater detail. The response 599 is received by a receiving service 551, which may correspond with natural language understanding (NLU) unit 552. The NLU unit 552 includes two subcomponents, an entity extractor 552A and an intent classifier 552B. Both the entity extractor 552A and the intent extractor 552B utilize a combination of rules and machine learned models to identify entities and intentions, respectively, found in the response.

Entities may include people, objects, locations, phone numbers, email addresses, dates, businesses and the like. Intents, on the other hand, are coded based upon business needs, or may be identified automatically through training or through interaction with a training desk. Particular intents of interest for a business conversation could include, for example, satisfied, disqualified, no further action and further action, in some embodiments. These intents may correspond to situations where the goals for a conversation target have been met (satisfied intent), where such goals are unable to be met (disqualified), where the goal is in progress without need for additional messaging (no further action), and where the goal is in process but requires additional information or messaging to be fully resolved (further action).

The receiving service 551 also may couple to a contact updater 553 which may update entity information, but operates independently of any conversation state transition. Contact updates are a side effect of receiving a response, and as such may be transition callback processes.

After the receiving service 551 completes its analysis of the received response, a conversation service module 554 may continue the classification. The conversation service module 554 may consist of a state machine initializer 554A that starts at an initial state and uses an inference engine 555 to determine which state to transition to. In circumstances where the inference engine 555 is unsure of what state to transition to (due to a model confidence below an acceptable threshold), a training desk 556 may alternatively be employed. A state machine transitioner 554B updates the state from the initial state to an end state for the response. Actions 557 may result from this state transition. Actions may include webhooks, accessing external systems for appointment setting, or may include status updates. Once an action is done, it typically is a permanent event. A state entry 554C component may populate scheduling rows on a state entry once associated with a schedule 558 received from the scheduler 540.

Figure 5C:
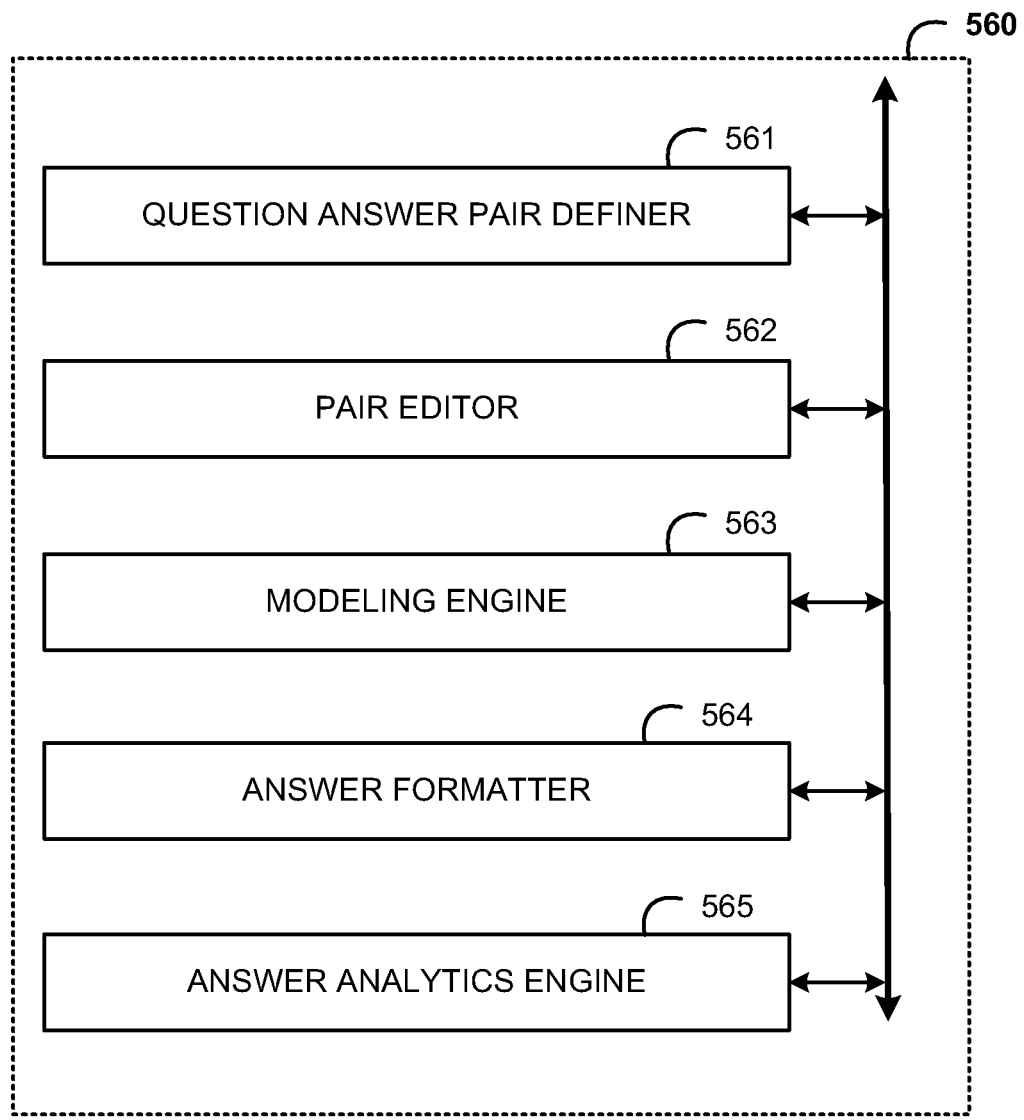
FIG. 5C is an example logical diagram of a question handler, in accordance with some embodiment.

In FIG. 5C, the question handler 560 is seen as including a question and answer pair definer 561, which defines sets of questions and answers in a basic format. An example of a basic question could include "What are your business hours?". While standardized question and answer pairs are populated within the system, each organization using this system has alternate and unique/specific answers. A pair editor 562 may be relied upon to update these question and answer pairs as needed.

When actual questions are received however, the question may in fact take many forms. For example, for the standard question presented above, possible variants could include "when are you open?, "what are your hours?", and "what time do you open today?". A modeling engine 563 used input from training desks and prior conversations to map these various questions to the 'standard' version of the question. The system then can look up the corresponding 'standard' answer.

Outputting the same standard answer repeatedly, however, is not very 'humanlike' and in order to address this, an answer formatter 564 can reformat the standard answers, in a pseudorandom manner, to generate varied responses. The formatted answer may be outputted as a stand-alone answer, or may be incorporated into the next message in a series. Next message timing can be used to determine if the answer should be standalone or not.

In some embodiments, the questions are classified and mapped to answers in progressively more detailed levels of a hierarchy. At the lowest level a specific question may be classified. Next, a type of question may be classified. At a higher level, the system may determine merely that a question of some sort has been asked. The system may answer at the most granular level of question specificity that the classification is confident of.

Finally, an answer analytics engine 565 may generate summaries of the types and frequency of answers being asked. These reports may be done by conversation series, industry, objective or the like. This may be used to provide ratios and other metrics to provide a client a sense of how important a given question is.

Figure 5D:
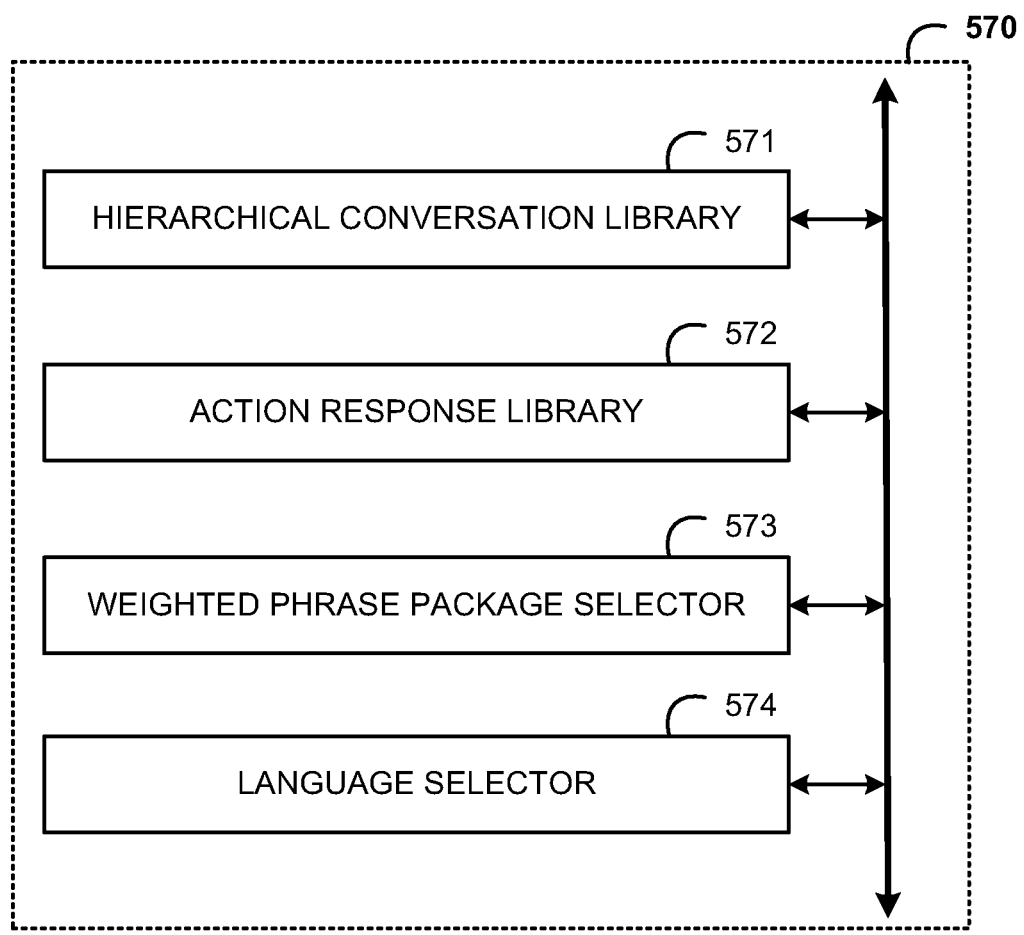
FIG. 5D is an example logical diagram of a message delivery handler, in accordance with some embodiment.

FIG. 5D provides an example diagram of the message delivery handler 570. This system component receives output form the classification engine 550 and the question handler 560 and performs its own processing to arrive at the final outgoing message. The message delivery handler 570 may include a hierarchical conversation library 571 for storing all the conversation components for building a coherent message. The hierarchical conversation library 571 may be a large curated library, organized and utilizing multiple inheritance along a number of axes: organizational levels, access-levels (rep-→group-→customer-→public). The hierarchical conversation library 571 leverages sophisticated library management mechanisms, involving a rating system based on achievement of specific conversation objectives, gamification via contribution rewards, and easy searching of conversation libraries based on a clear taxonomy of conversations and conversation trees.

In addition to merely responding to a message with a response, the message delivery handler 570 may also include a set of actions that may be undertaken linked to specific triggers, these actions and associations to triggering events may be stored in an action response library 572. For example, a trigger may include "Please send me the brochure." This trigger may be linked to the action of attaching a brochure document to the response message, which may be actionable via a webhook or the like. The system may choose attachment materials from a defined library (SalesForce repository, etc.), driven by insights gained from parsing and classifying the previous response, or other knowledge obtained about the target, client, and conversation. Other actions could include initiating a purchase (order a pizza for delivery for example) or pre-starting an ancillary process with data known about the target (kick of an application for a car loan, with name, etc. already pre-filled in for example). Another action that is considered is the automated setting and confirmation of appointments.

The message delivery handler 570 may have a weighted phrase package selector 573 that incorporates phrase packages into a generated message based upon their common usage together, or by some other metric.

Lastly, the message delivery handler 570 may operate to select which language to communicate using. In prior disclosures, it was noted that embodiments of the AI classification system systems may be enabled to perform multiple language analysis. Rather than perform classifications using full training sets for each language, as is the traditional mechanism, the systems leverage dictionaries for all supported languages, and translations to reduce the needed level of training sets. In such systems, a primary language is selected, and a full training set is used to build a model for the classification using this language. Smaller training sets for the additional languages may be added into the machine learned model. These smaller sets may be less than half the size of a full training set, or even an order of magnitude smaller. When a response is received, it may be translated into all the supported languages, and this concatenation of the response may be processed for classification. The flip side of this analysis is the ability to alter the language in which new messages are generated. For example, if the system detects that a response is in French, the classification of the response may be performed in the above-mentioned manner, and similarly any additional messaging with this contact may be performed in French.

Determination of which language to use is easiest if the entire exchange is performed in a particular language. The system may default to this language for all future conversation. Likewise, an explicit request to converse in a particular language may be used to determine which language a conversation takes place in. However, when a message is not requesting a preferred language, and has multiple language elements, the system may query the user on a preferred language and conduct all future messaging using the preferred language.

Figure 5E:
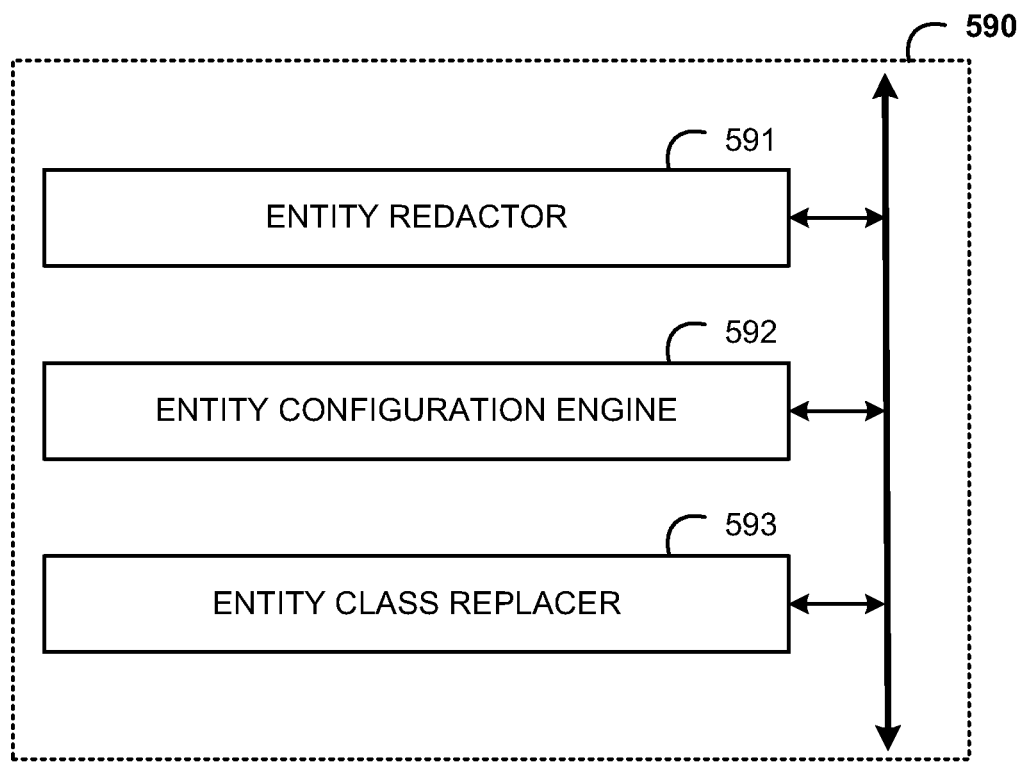
FIG. 5E is an example logical diagram of a privacy manager, in accordance with some embodiment.

Turning to FIG. 5E, the privacy manager 590 is presented in greater detail. This manager includes an entity redactor 591 which is capable of removing entity information that meets a predefined category from a message or report. For example, the General Data Protection Regulation (GDPR) is an extensive set of regulations and obligations mandated by the European Union that prohibits data which is determined to be "personally identifiable information" (PII or PI) from being shared without permission of the person to who the data pertains. Violations of the GDPR can result in steep fines, including fees calculates as percentages of revenue. For many businesses, violation of the GDPR or similar regulations may be major events that can result in bankruptcy or other financial hardships. The redaction of information, such as personally identifiable information allows the privacy manager to safeguard a client against such violations.

Entities that are redacted are labeled in a more generic manner. An entity configuration engine 592 may store these label and associated entities in a specific configuration file that is encrypted or otherwise kept safe from improper consumption. The entity class replacer 593 then inserts the generic labels into the response or message for human consumption. This may be useful when training models with human operators, or when generating reports of conversations.

II. Methods

Now that the systems for dynamic messaging and natural language processing techniques have been broadly described, attention will be turned to processes employed to perform AI driven conversations with attendant actions.

Figure 6:
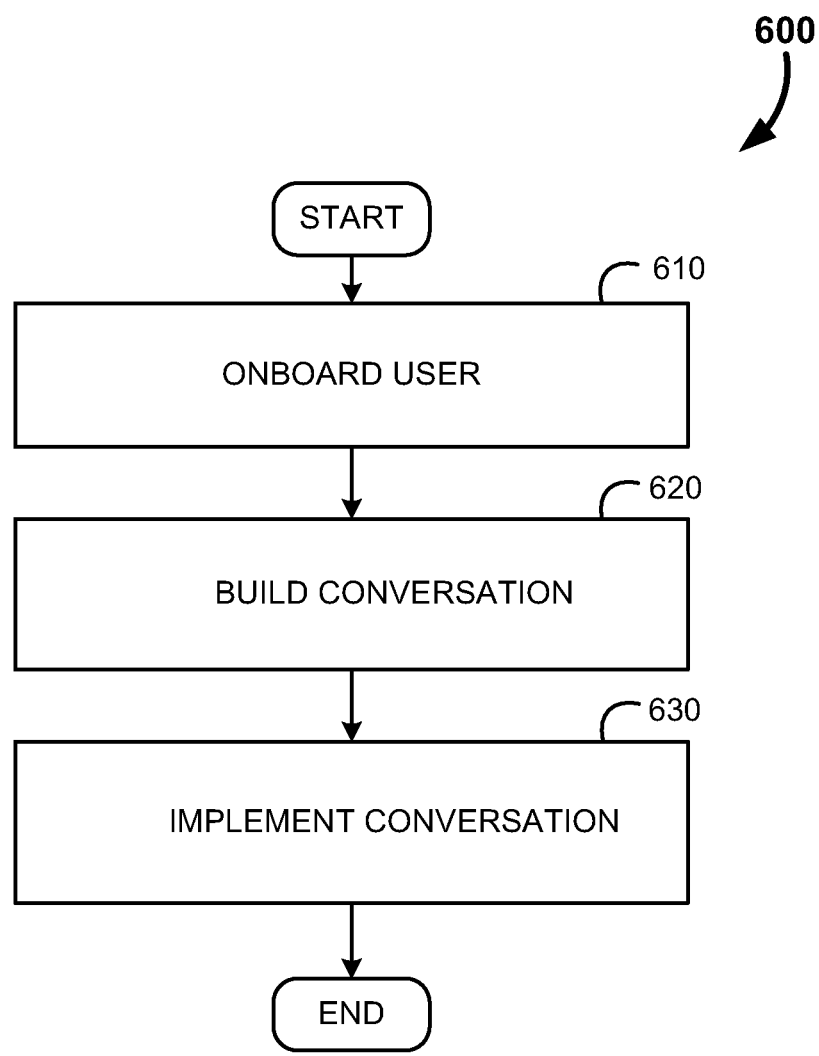
FIG. 6 is an example flow diagram for a dynamic message conversation, in accordance with some embodiment.

In FIG. 6 an example flow diagram for a dynamic message conversation is provided, shown generally at 600. The process can be broadly broken down into three portions: the on-boarding of a user (at 610), conversation generation (at 620) and conversation implementation (at 630). The following figures and associated disclosure will delve deeper into the specifics of these given process steps.

Figure 7:
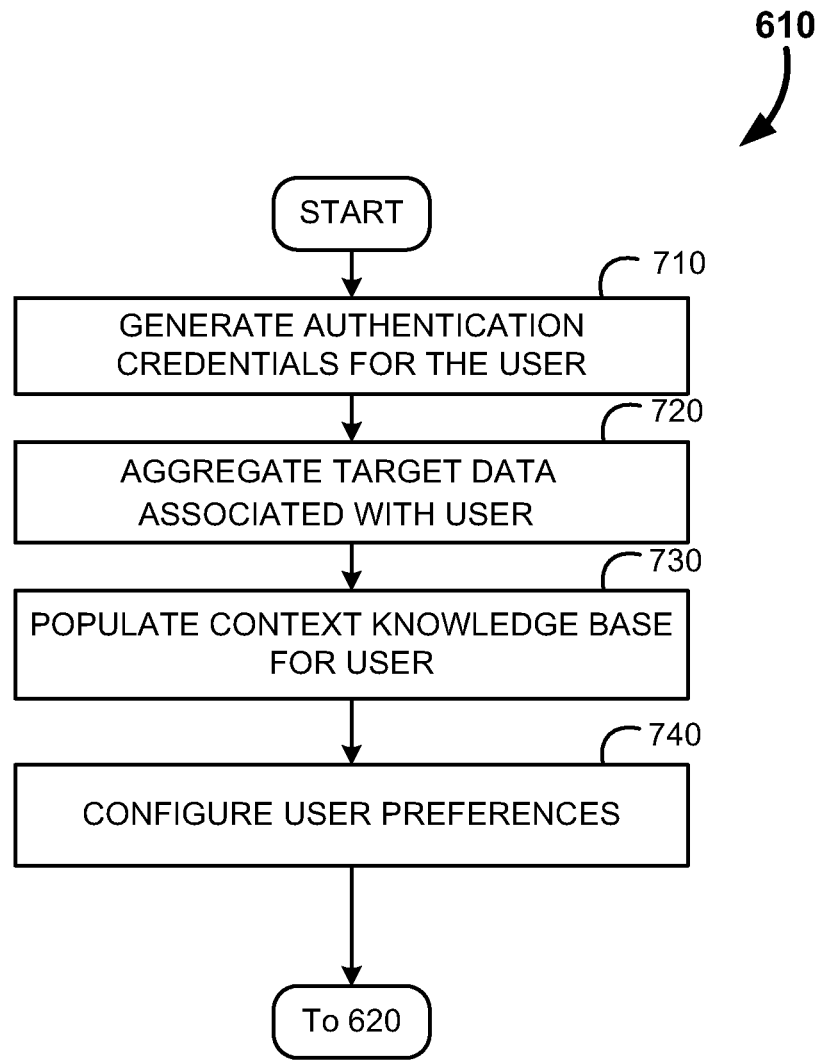
FIG. 7 is an example flow diagram for the process of on-boarding a business actor, in accordance with some embodiment.

FIG. 7, for example, provides a more detailed look into the on-boarding process, shown generally at 610. Initially a user is provided (or generates) a set of authentication credentials (at 710). This enables subsequent authentication of the user by any known methods of authentication. This may include username and password combinations, biometric identification, device credentials, etc.

Next, the target data associated with the user is imported, or otherwise aggregated, to provide the system with a target database for message generation (at 720). Likewise, context knowledge data may be populated as it pertains to the user (at 730). Often there are general knowledge data sets that can be automatically associated with a new user; however, it is sometimes desirable to have knowledge sets that are unique to the user's conversation that wouldn't be commonly applied. These more specialized knowledge sets may be imported or added by the user directly.

Lastly, the user is able to configure their preferences and settings (at 740). This may be as simple as selecting dashboard layouts, to configuring confidence thresholds required before alerting the user for manual intervention.

Figure 8:
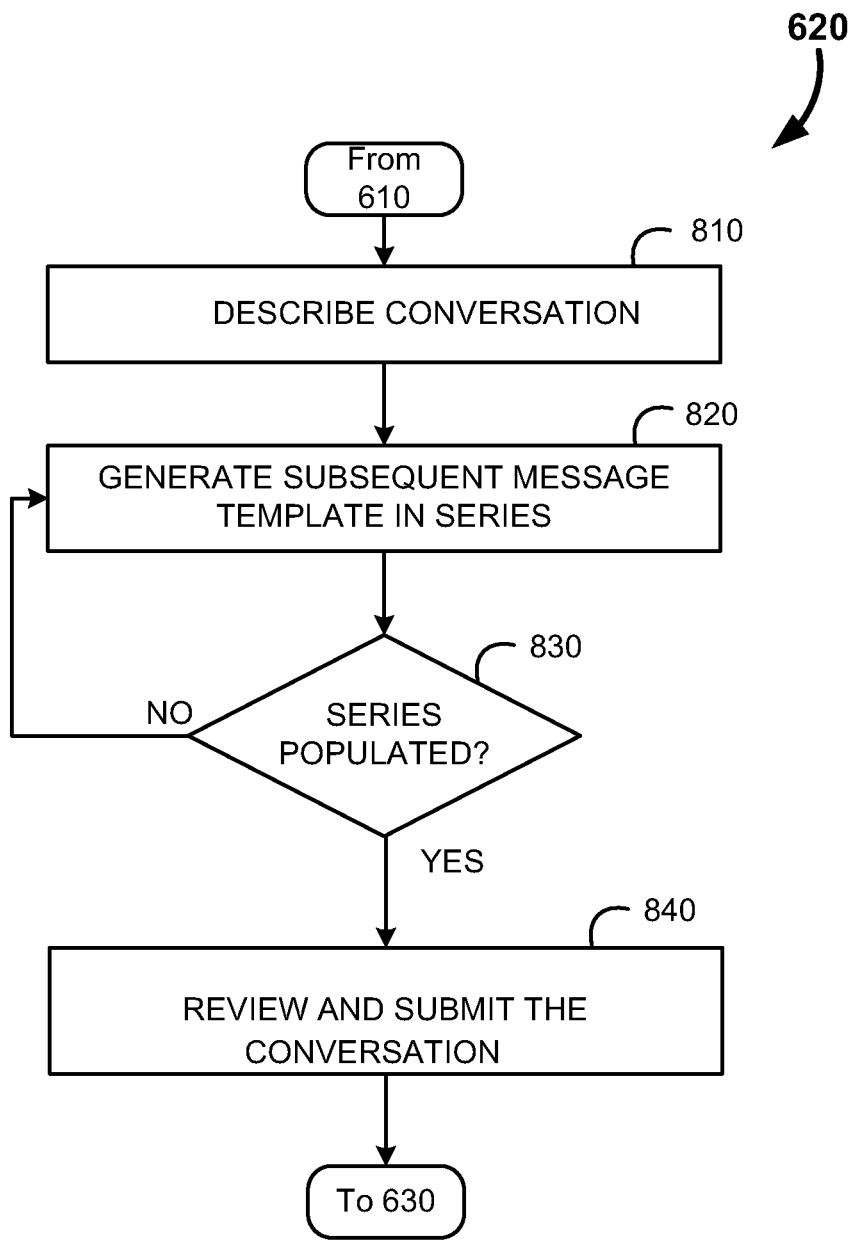
FIG. 8 is an example flow diagram for the process of building a business activity such as conversation, in accordance with some embodiment.

Moving on, FIG. 8 is the example flow diagram for the process of building a conversation, shown generally at 620. The user initiates the new conversation by first describing it (at 810). Conversation description includes providing a conversation name, description, industry selection, and service type. The industry selection and service type may be utilized to ensure the proper knowledge sets are relied upon for the analysis of responses.

Figure 9:
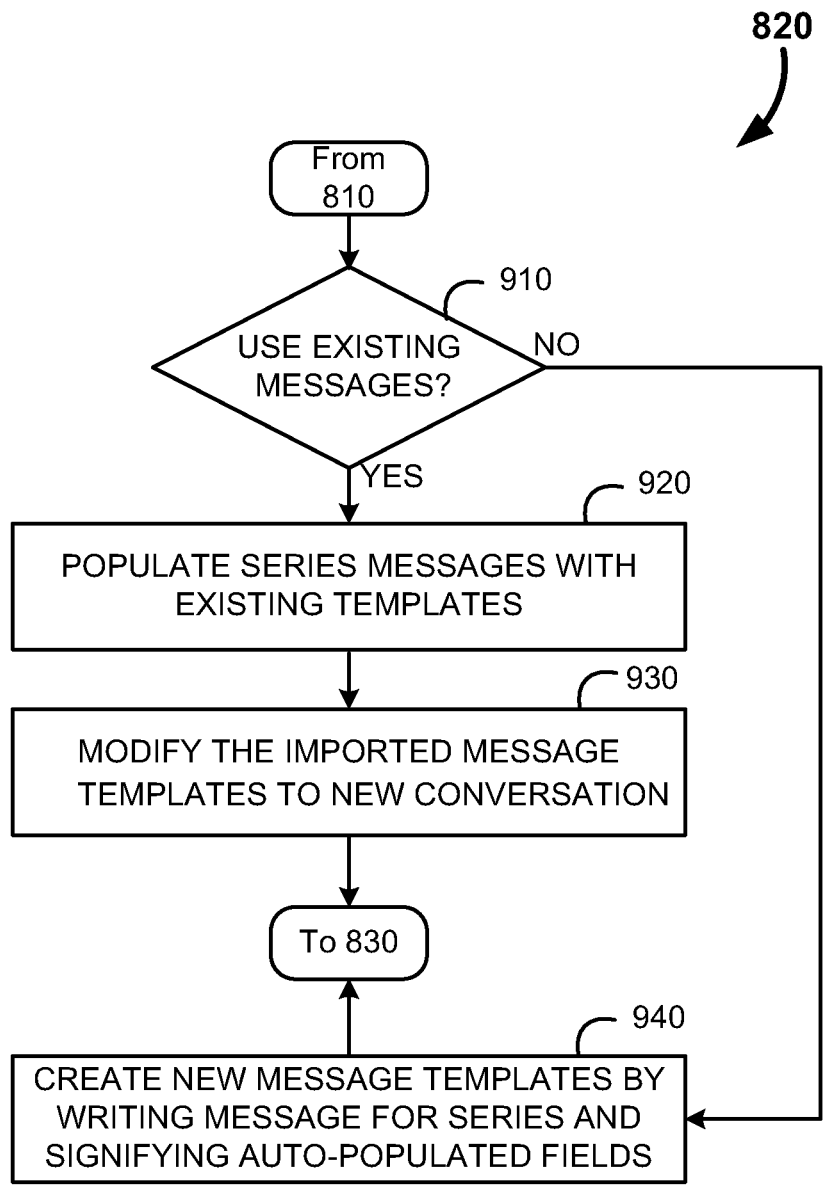
FIG. 9 is an example flow diagram for the process of generating message templates, in accordance with some embodiment.

After the conversation is described, the message templates in the conversation are generated (at 820). If the series is populated (at 830), then the conversation is reviewed and submitted (at 840). Otherwise, the next message in the template is generated (at 820). FIG. 9 provides greater details of an example of this sub-process for generating message templates. Initially the user is queried if an existing conversation can be leveraged for templates, or whether a new template is desired (at 910).

If an existing conversation is used, the new message templates are generated by populating the templates with existing templates (at 920). The user is then afforded the opportunity to modify the message templates to better reflect the new conversation (at 930). Since the objectives of many conversations may be similar, the user will tend to generate a library of conversations and conversation fragments that may be reused, with or without modification, in some situations. Reusing conversations has time saving advantages, when it is possible.

However, if there is no suitable conversation to be leveraged, the user may opt to write the message templates from scratch using the Conversation Editor (at 940). When a message template is generated, the bulk of the message is written by the user, and variables are imported for regions of the message that will vary based upon the target data. Successful messages are designed to elicit responses that are readily classified. Higher classification accuracy enables the system to operate longer without user interference, which increases conversation efficiency and user workload.

Messaging conversations can be broken down into individual objectives for each target. Designing conversation objectives allows for a smoother transition between messaging series. Table 1 provides an example set of messaging objectives for a sales conversation.

TABLE 1

Template Objectives

| Series | Objective |
|---|---|
| 1 | Verify Email Address |
| 2 | Obtain Phone Number |
| 2 | Introduce Sales Representative |
| 3 | Verify Rep Follow-Up |

Likewise, conversations can have other arbitrary set of objectives as dictated by client preference, business function, business vertical, channel of communication and language. Objective definition can track the state of every target. Inserting personalized objectives allows immediate question answering at any point in the lifecycle of a target. The state of the conversation objectives can be tracked individually as shown below in reference to Table 2.

TABLE 2

Objective tracking

| Target ID | Conversation ID | Objective | Type | Pending | Complete |
|---|---|---|---|---|---|
| 100 | 1 | Verify Email Address | Q | 1 | 1 |
| 100 | 1 | Obtain Phone Number | Q | 0 | 1 |
| 100 | 1 | Give Location Details | I | 1 | 0 |
| 100 | 1 | Verify Rep Follow-Up | Q | 0 | 0 |

Table 2 displays the state of an individual target assigned to conversation 1, as an example. With this design, the state of individual objectives depends on messages sent and responses received. Objectives can be used with an informational template to make a series transition seamless. Tracking a target's objective completion allows for improved definition of target's state, and alternative approaches to conversation message building. Conversation objectives are not immediately required for dynamic message building implementation but become beneficial soon after the start of a conversation to assist in determining when to move forward in a series.

Dynamic message building design depends on 'message_building' rules in order to compose an outbound document. A Rules child class is built to gather applicable phrase components for an outbound message. Applicable phrases depend on target variables and target state.

To recap, to build a message, possible phrases are gathered for each template component in a template iteration. In some embodiment, a single phrase can be chosen randomly from possible phrases for each template component. Alternatively, as noted before, phrases are gathered and ranked by "relevance". Each phrase can be thought of as a rule with conditions that determine whether or not the rule can apply and an action describing the phrase's content.

Relevance is calculated based on the number of passing conditions that correlate with a target's state. A single phrase is selected from a pool of most relevant phrases for each message component. Chosen phrases are then imploded to obtain an outbound message. Logic can be universal or data specific as desired for individual message components.

Variable replacement can occur on a per phrase basis, or after a message is composed. Post message-building validation can be integrated into a message-building class. All rules interaction will be maintained with a messaging rules model and user interface.

Figure 10:
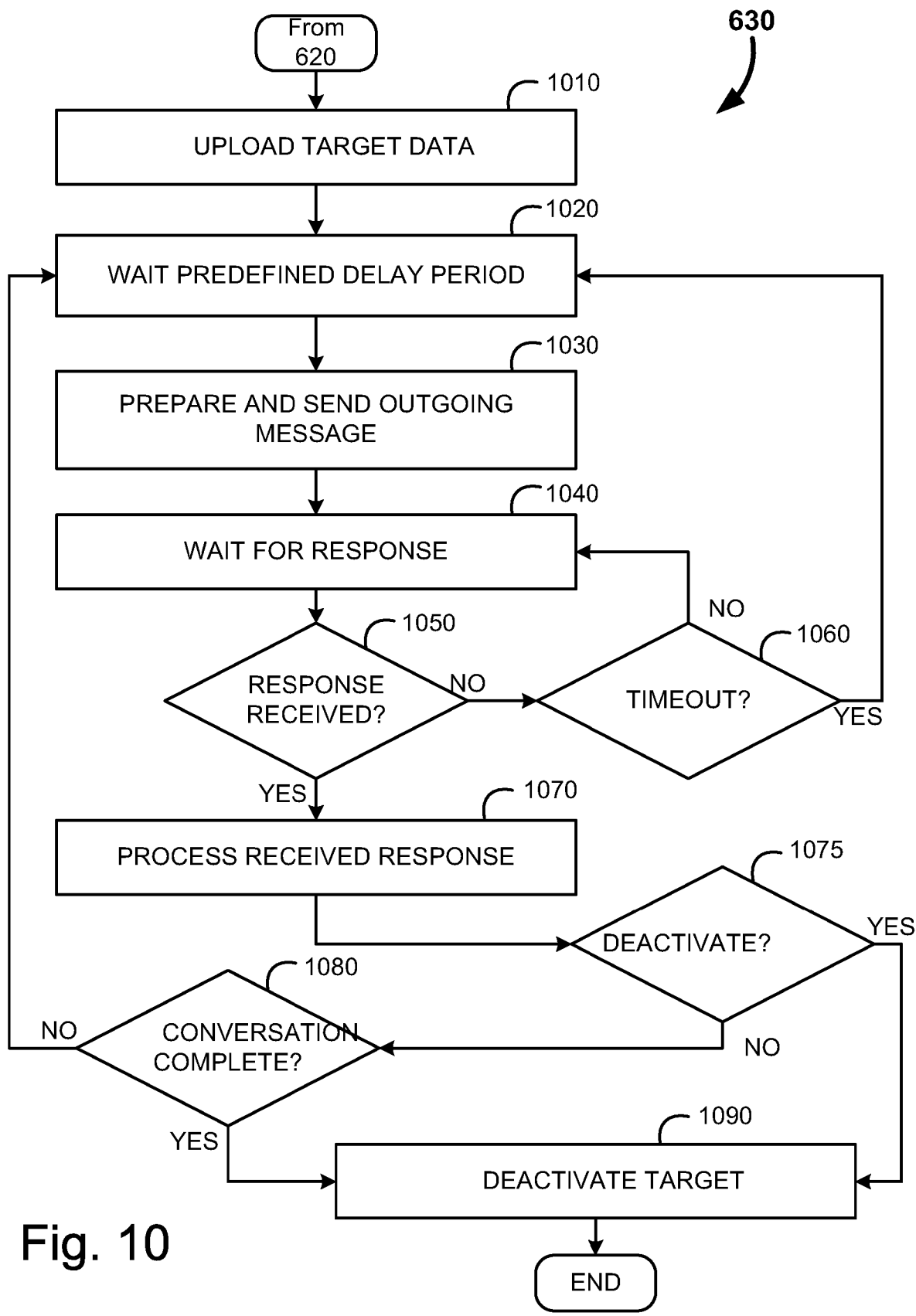
FIG. 10 is an example flow diagram for the process of implementing the conversation, in accordance with some embodiment.

Once the conversation has been built out it is ready for implementation. FIG. 10 is an example flow diagram for the process of implementing the conversation, shown generally at 630. Here the lead (or target) data is uploaded (at 1010). Target data may include any number of data types, but commonly includes names, contact information, date of contact, item the target was interested in (in the context of a sales conversation), etc. Other data can include open comments that targets supplied to the target provider, any items the target may have to trade in, and the date the target came into the target provider's system. Often target data is specific to the industry, and individual users may have unique data that may be employed.

An appropriate delay period is allowed to elapse (at 1020) before the message is prepared and sent out (at 1030). The waiting period is important so that the target does not feel overly pressured, nor the user appears overly eager. Additionally, this delay more accurately mimics a human correspondence (rather than an instantaneous automated message). Additionally, as the system progresses and learns, the delay period may be optimized by a cadence optimizer to be ideally suited for the given message, objective, industry involved, and actor receiving the message.

Figure 11:
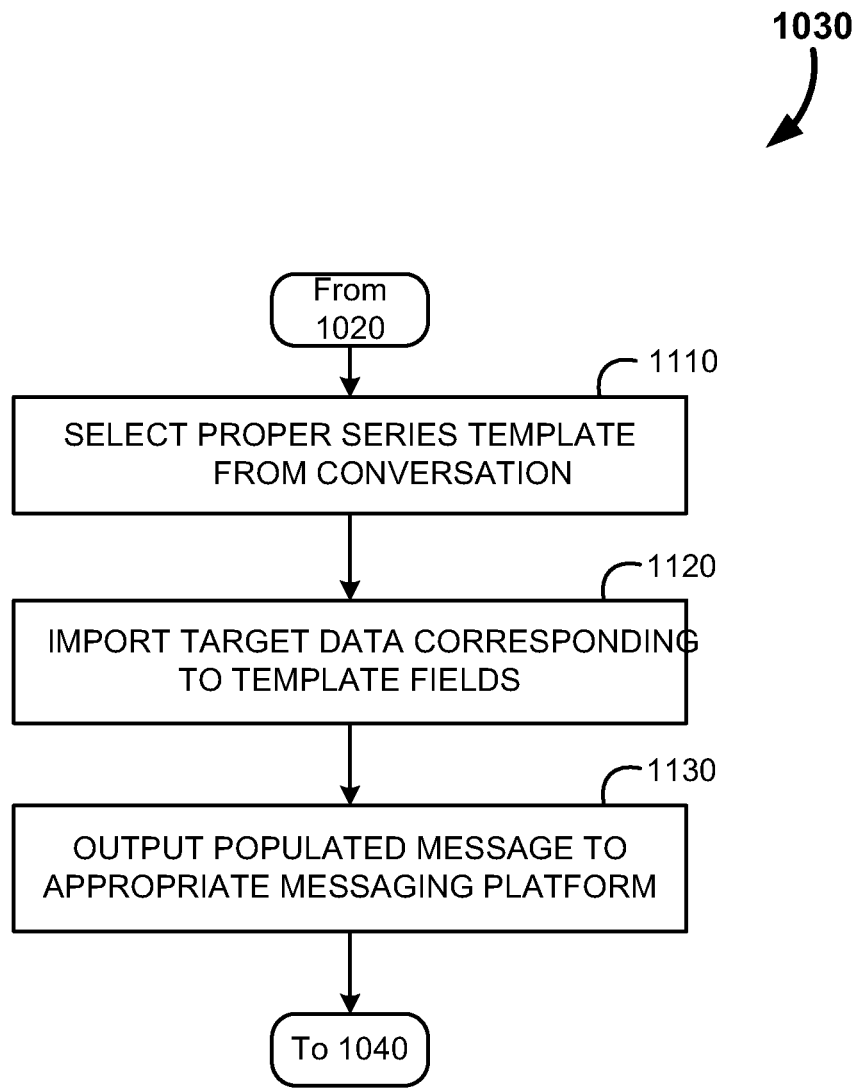
FIG. 11 is an example flow diagram for the process of preparing and sending the outgoing message, in accordance with some embodiment.

FIG. 11 provides a more detailed example of the message preparation and output. In this example flow diagram, the message within the series is selected based upon which objectives are outstanding (at 1110). Typically, the messages will be presented in a set order; however, if the objective for a particular target has already been met for a given series, then another message may be more appropriate. Likewise, if the recipient didn't respond as expected, or not at all, it may be desirous to have alternate message templates to address the target most effectively.

After the message template is selected from the series, the target data is parsed through, and matches for the variable fields in the message templates are populated (at 1120). Variable filed population, as touched upon earlier, is a complex process that may employ personality matching, and weighting of phrases or other inputs by success rankings.

These methods will also be described in greater detail when discussed in relation to variable field population in the context of response generation. Such processes may be equally applicable to this initial population of variable fields.

In addition, or alternate to, personality matching or phrase weighting, selection of wording in a response could, in some embodiments, include matching wording or style of the conversation target. People, in normal conversation, often mirror each other's speech patterns, mannerisms and diction. This is a natural process, and an AI system that similarly incorporates a degree of mimicry results in a more 'human-like' exchange.

Additionally, messaging may be altered by the class of the audience (rather than information related to a specific target personality). For example, the system may address an enterprise customer differently than an individual consumer. Likewise, consumers of one type of good or service may be addressed in subtly different ways than other customers. Likewise, a customer service assistant may have a different tone than an HR assistant, etc.

The populated message is output to the communication channel appropriate messaging platform (at 1130), which as previously discussed typically includes an email service, but may also include SMS services, instant messages, social networks, audio networks using telephony or speakers and microphone, or video communication devices or networks or the like. In some embodiments, the contact receiving the messages may be asked if he has a preferred channel of communication. If so, the channel selected may be utilized for all future communication with the contact. In other embodiments, communication may occur across multiple different communication channels based upon historical efficacy and/or user preference. For example, in some particular situations a contact may indicate a preference for email communication. However, historically, in this example, it has been found that objectives are met more frequently when telephone messages are utilized. In this example, the system may be configured to initially use email messaging with the contact, and only if the contact becomes unresponsive is a phone call utilized to spur the conversation forward. In another embodiment, the system may randomize the channel employed with a given contact, and over time adapt to utilize the channel that is found to be most effective for the given contact.

Returning to FIG. 10, after the message has been output, the process waits for a response (at 1040). If a response is not received (at 1050) the process determines if the wait has been timed out (at 1060). Allowing a target to languish too long may result in missed opportunities; however, pestering the target too frequently may have an adverse impact on the relationship. As such, this timeout period may be user defined and will typically depend on the communication channel. Often the timeout period varies substantially, for example for email communication the timeout period could vary from a few days to a week or more. For real-time chat communication channel implementations, the timeout period could be measured in seconds, and for voice or video communication channel implementations, the timeout could be measured in fractions of a second to seconds. If there has not been a timeout event, then the system continues to wait for a response (at 1050). However, once sufficient time has passed without a response, it may be desirous to return to the delay period (at 1020) and send a follow-up message (at 1030). Often there will be available reminder templates designed for just such a circumstance.

Figure 12:
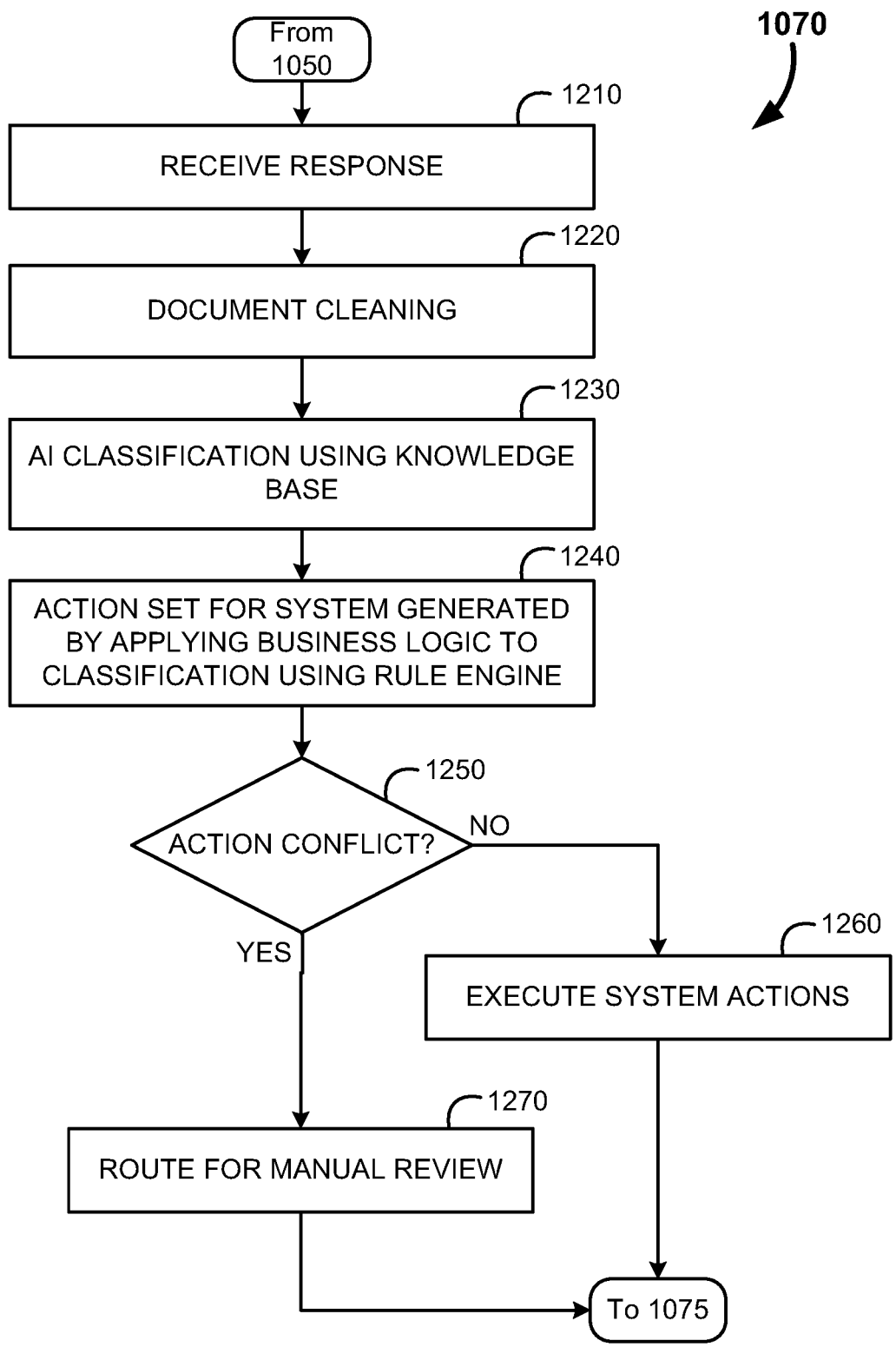
FIG. 12 is an example flow diagram for the process of processing received responses, in accordance with some embodiment.

However, if a response is received, the process may continue with the response being processed (at 1070). This processing of the response is described in further detail in relation to FIG. 12. In this sub-process, the response is initially received (at 1210) and the document may be cleaned (at 1220).

Figure 13:
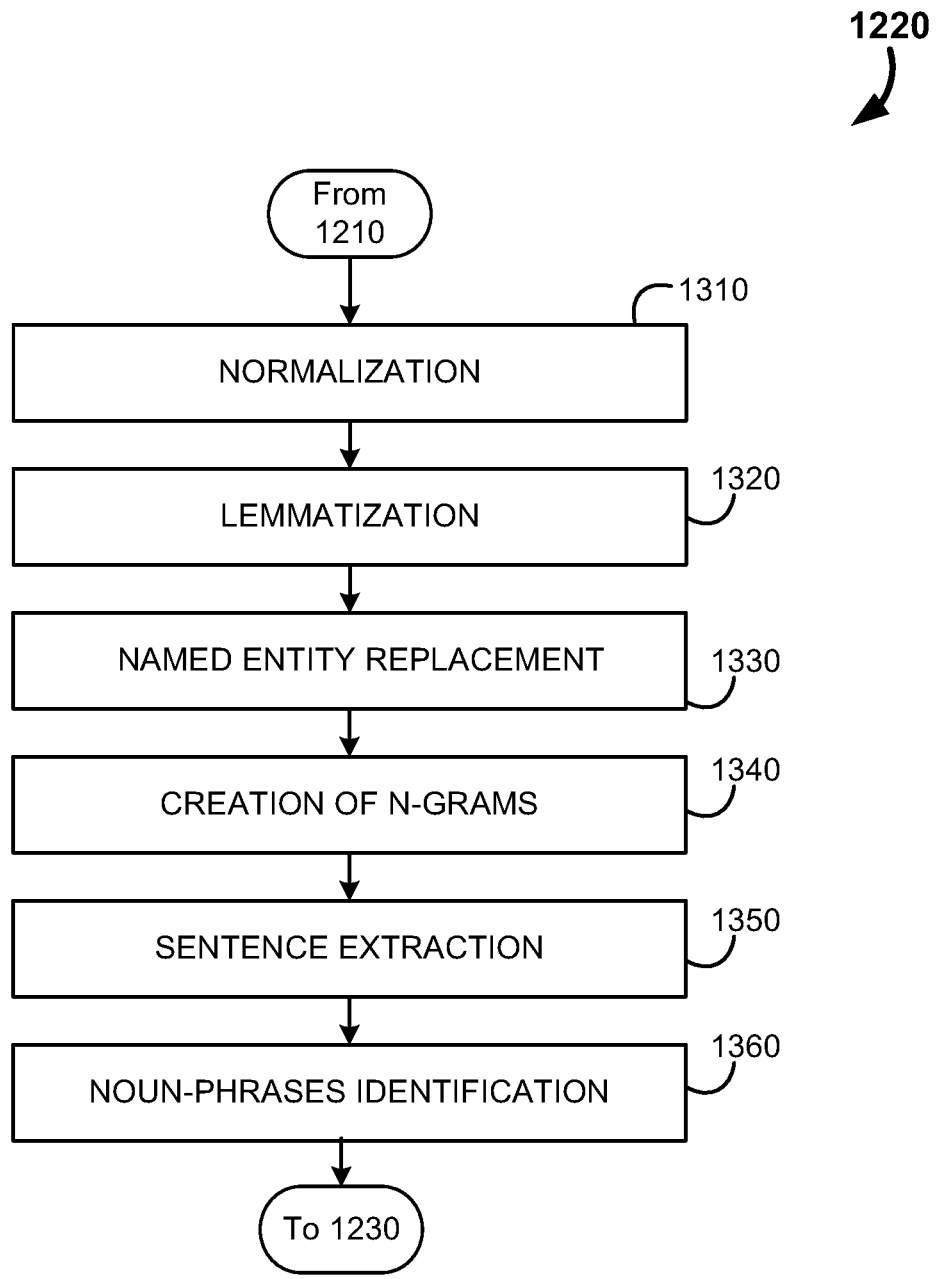
FIG. 13 is an example flow diagram for the process of document cleaning, in accordance with some embodiment.

Document cleaning is described in greater detail in relation with FIG. 13. Upon document receipt, adapters may be utilized to extract information from the document for shepherding through the cleaning and classification pipelines. For example, for an email, adapters may exist for the subject and body of the response, often a number of elements need to be removed, including the original message, HTML encoding for HTML style responses, enforce UTF-8 encoding so as to get diacritics and other notation from other languages, and signatures so as to not confuse the AI. Only after all this removal process does the normalization process occur (at 1310) where characters and tokens are removed in order to reduce the complexity of the document without changing the intended classification.

After the normalization, documents are further processed through lemmatization (at 1320), name entity replacement (at 1330), the creation of n-grams (at 1340) sentence extraction (at 1350), noun-phrase identification (at 1360) and extraction of out-of-office features and/or other named entity recognition (at 1370). Each of these steps may be considered a feature extraction of the document. Historically, extractions have been combined in various ways, which results in an exponential increase in combinations as more features are desired. In response, the present method performs each feature extraction in discrete steps (on an atomic level) and the extractions can be "chained" as desired to extract a specific feature set.

Returning to FIG. 12, after document cleaning, the document is then provided to the AI platform for classification using the knowledge sets (at 1230). For the purpose of this disclosure, a "knowledge set" is a corpus of domain specific information that may be leveraged by the machine learned classification model. The knowledge sets may include a plurality of concepts and relationships between these concepts. It may also include basic concept-action pairings. The AI Platform will apply large knowledge sets to classify 'Continue Messaging', 'Do Not Email' and 'Send Alert' insights. Additionally, various domain specific 'micro-insights' can use smaller concise knowledge sets to search for distinct elements in responses.

For example, a 'Requested Location' insight can be trained to determine if a target has requested location details. The additional insights should be polled for each incoming message. Knowledge can be universal or target/conversation/question specific, if needed. Insight and knowledge set interaction will be maintained using the AI API within the AI Dashboard user interfaces.

A user interface exists to interact with message building rules. The rule creation interface allows for easy message building management and provide previews of all possible message compositions. The AI dashboard toolset can be expanded upon to build and apply new insights and knowledge sets. This AI dashboard may exist within administrative dashboards or as independent developer interfaces.

The system initially applies natural language processing through one or more AI machine learning models to process the message for the concepts contained within the message. As previously mentioned, there are a number of known algorithms that may be employed to categorize a given document, including Hard rule, Naïve Bayes, Sentiment, neural nets including convolutional neural networks and recurrent neural networks and variations, k-nearest neighbor, other vector-based algorithms, etc. to name a few. In some embodiments, the classification model may be automatically developed and updated as previously touched upon, and as described in considerable detail below as well. Classification models may leverage deep learning and active learning techniques as well, as will also be discussed in greater detail below.

After the classification has been generated, the system renders intents from the message. Intents, in this context, are categories used to answer some underlying question related to the document. The classifications may map to a given intent based upon the context of the conversation message. A confidence score, and accuracy score, are then generated for the intent. Intents are used by the model to generate actions. In some embodiments, a user manually configures the intents that may be classified for. Generally, an initial set of user configured intents are employed, but in some cases the system may automatically identify and add additional intents to the list of possible intents via input at a training desk, or even through machine learning based upon action corrections by the training desk.

Objectives of the conversation, as they are updated, may be used to redefine the actions collected and scheduled. For example, 'skip-to-follow-up' action may be replaced with an 'informational message' introducing the sales rep before proceeding to 'series 3' objectives. Additionally, 'Do Not Email' or 'Stop Messaging' classifications should deactivate a target and remove scheduling at any time during a target's life-cycle. Intents and actions may also be annotated with "facts". For example, if the determined action is to "check back later" this action may be annotated with a date 'fact' that indicates when the action is to be implemented.

Figure 14:
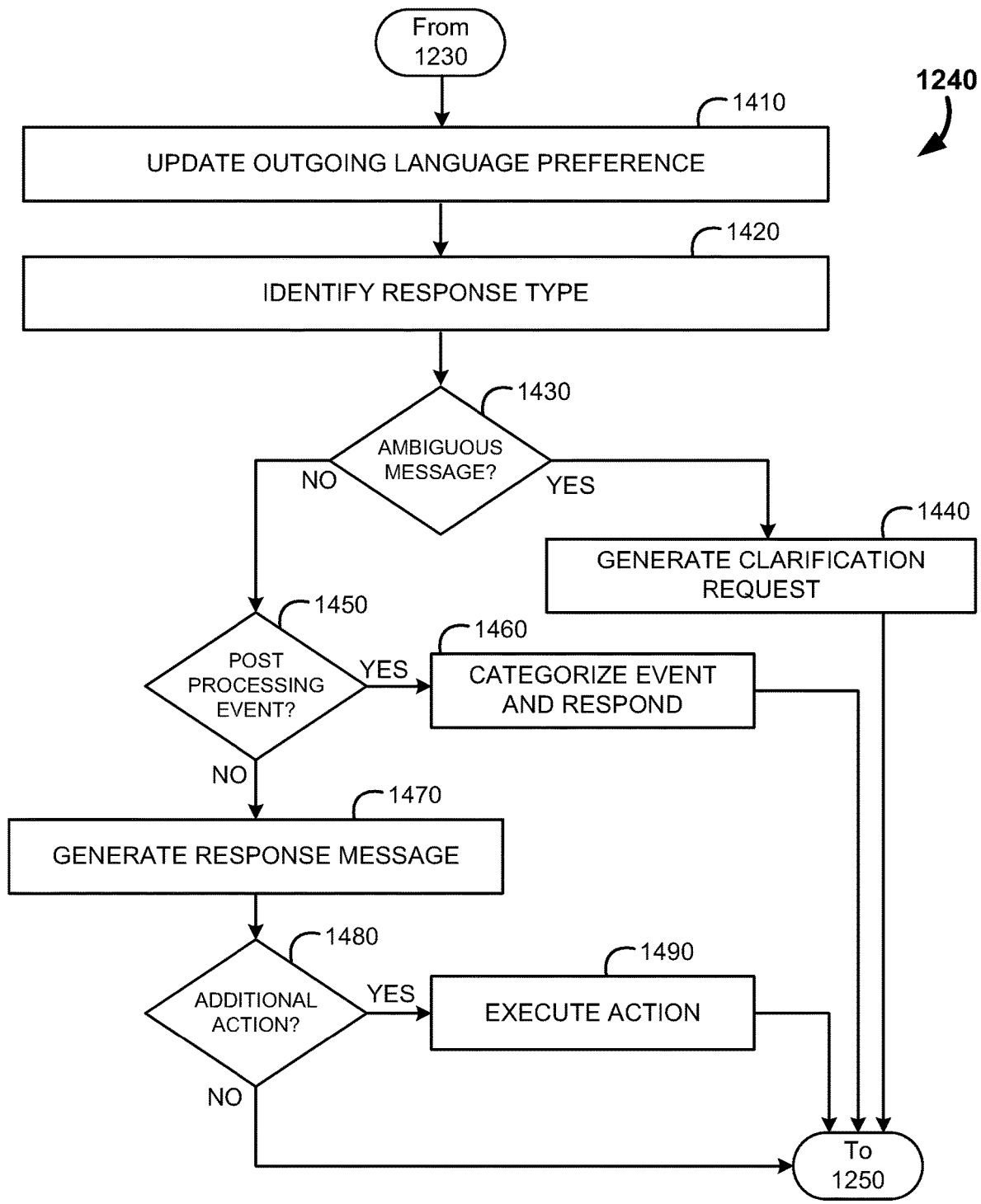
FIG. 14 is an example flow diagram for message classification and response with action setting, in accordance with some embodiment.

Returning to FIG. 12, the actions received from the inference engine may be set (at 1240). FIG. 14 provides a more detailed flow chart disclosing an example process for the setting of the action, shown at 1240. In this example process, the language utilized in the conversation may be initially checked and updated accordingly (at 1410). As noted previously, language selection may be explicitly requested by the target, or may be inferred from the language used thus far in the conversation. If multiple languages have been used in any appreciable level, the system may likewise request a clarification of preference from the target. Lastly, this process may include responding appropriately if a message language is not supported.

After language preference is determined, the response type is identified (at 1420) based upon the message it is responding to (question, versus informational, vs introductory, etc.) as well as classifications. Next a determination is made if the response was ambiguous (at 1430). As noted previously, an ambiguous message is one for which a classification can be rendered at a high level of confidence, but which meaning is still unclear due to lack of contextual cues. Such ambiguous messages may be responded to by generating and sending a clarification request (at 1440).

Figure 15:
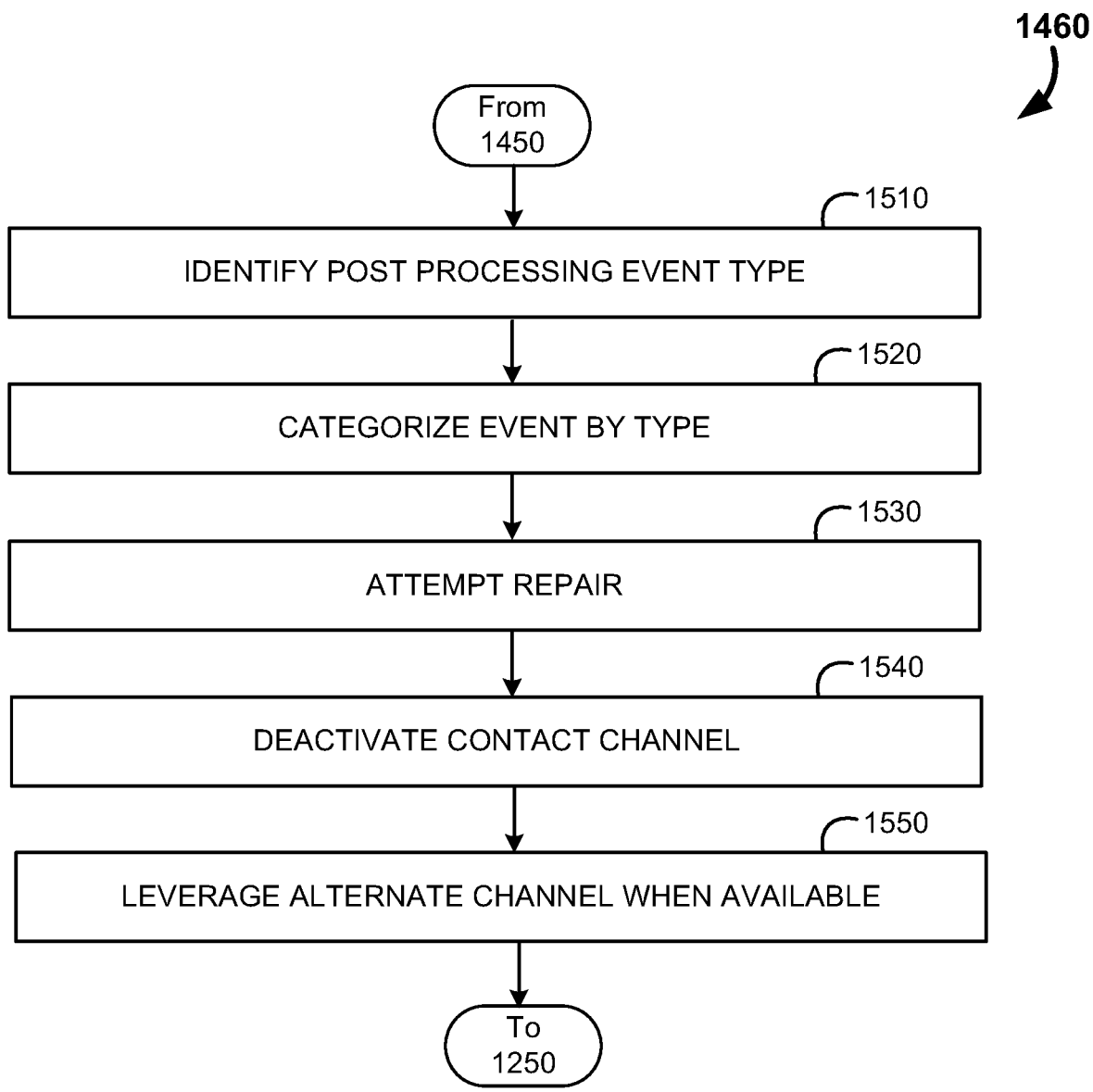
FIG. 15 is an example flow diagram for event categorization and response, in accordance with some embodiment.

However, if the message is not ambiguous, a separate determination may be performed to determine if a post processing event is needed (at 1450). Post processing events include bounced emails, disconnected phone numbers, or other events that impede with the conversation. If such an event exists, the system may categorize and respond to the event accordingly (at 1460). FIG. 15 provides more detailed flow diagram for this response to post processing events and begins with identification of the post processing event type (at 1510). This is important, because a failure to deliver an email may be treated very differently than an automated vacation notice, etc. The event is next categorized by its type (at 1520) and a repair is attempted (at 1530). For example, if an email message bounces the system may initially confirm the email address against prior successful emails, query public databases for updates to email addresses (as commonly occurs after a name change) and seek clarification using alternate communication channels (even if said channels are not preferred). The defective channel may then be deactivated (at 1540), and alternate channels may be leveraged if identified during the repair attempt (at 1550).

Figure 16:
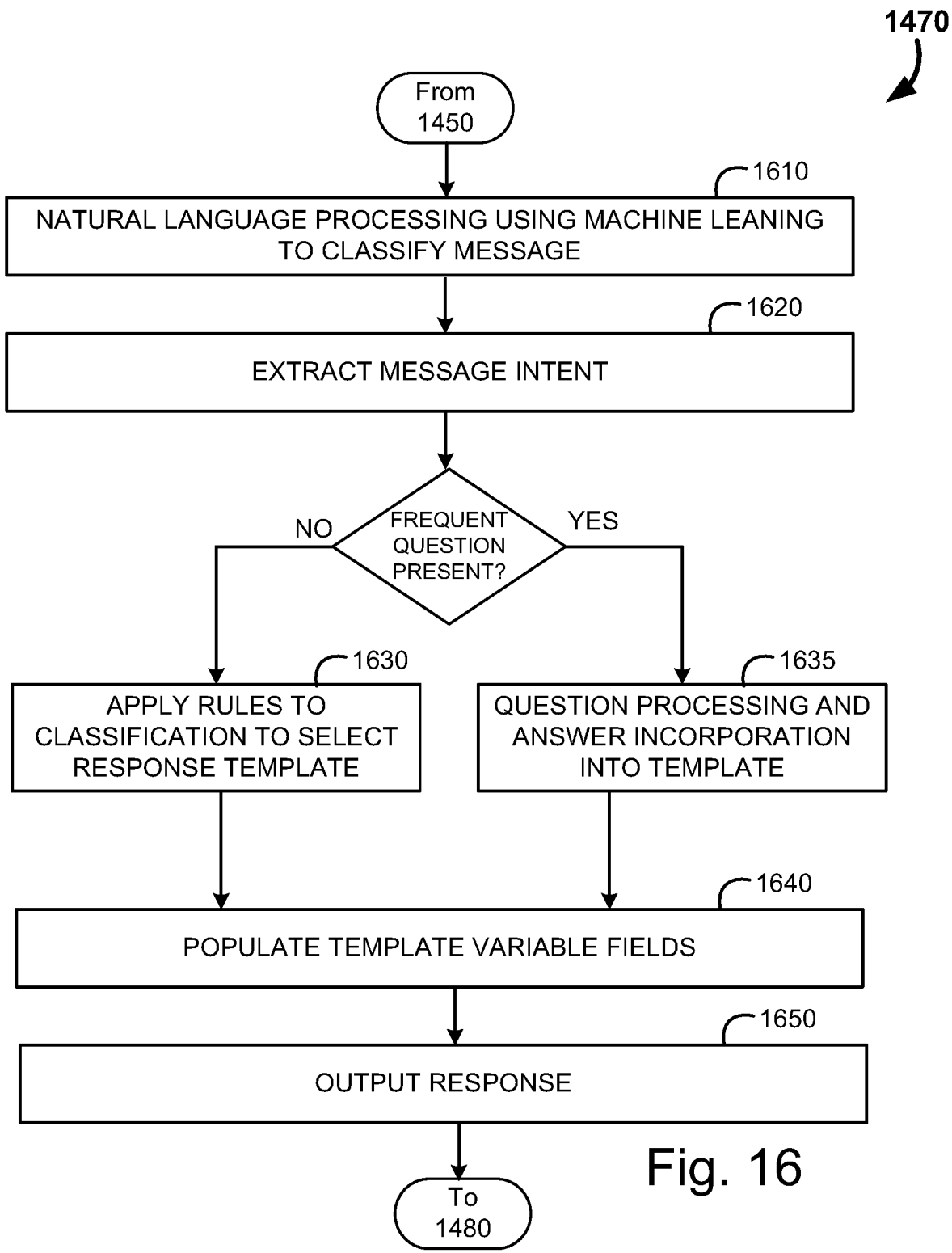
FIG. 16 is an example flow diagram for the generation of a response message, in accordance with some embodiment.

Returning to FIG. 14, if no post processing event is present the response message may be generated (at 1470) in a manner disclosed in greater detail in relation to FIG. 16. As noted before the natural language processing, using machine learning, has been used to classify the message (at 1610). The intent of the message is thus extracted (at 1620). An inquiry is made whether a question has been asked in the response message. Responses to informational messages may be classified differently than responses to questions. If no question was asked, rules are applied to the classification and intent to select which response template to utilize (at 1630). The rules employed include identifying the type of message was being responded to and rules linking classifications and intents to response types. If a question was asked, the question may be processed and the resulting answer incorporated into the response template (at 1635).

Classification depends on the type of responses received by each outgoing message. 'Do Not Email' or 'Stop Messaging' classifications should deactivate a target and remove scheduling at any time during a lead's lifecycle. Target objectives are also updated as a result of the classifications. If the AI makes a 'continue messaging' classification and incomplete objectives remain, the next messaging series will be scheduled. However, with the introduction of informational messages, it will be desirable to send multiple messages for a single series. For example, if a target is found to request location details in a series 2 response, it may be desirable to schedule an immediate informational message and a delayed follow-up verification.

Figure 17:
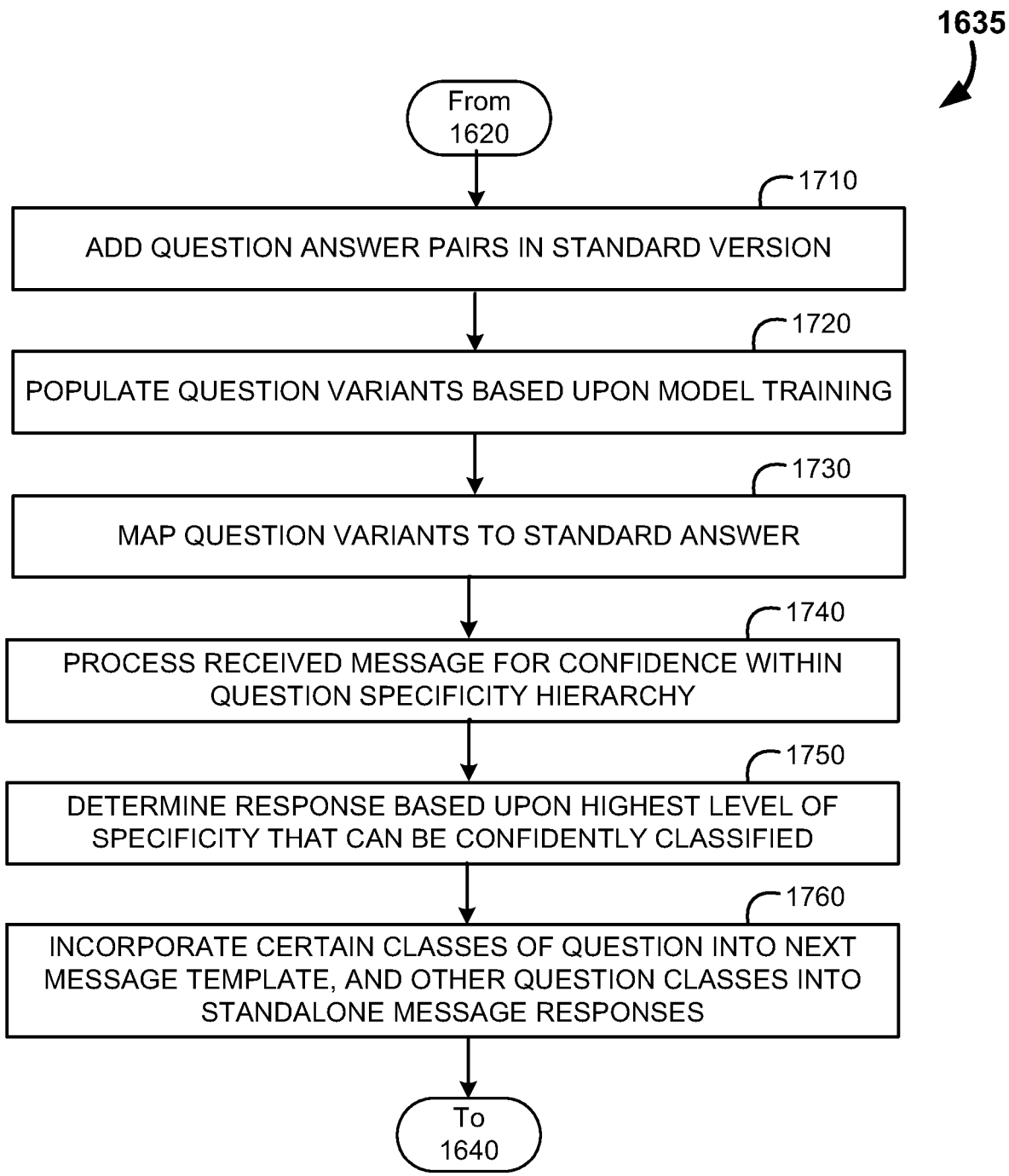
FIG. 17 is an example flow diagram for question processing, in accordance with some embodiment.

The process for question handling and response is provided in greater detail in relation to FIG. 17, where the system is initially configured to recognize questions and provide varied answers based upon confidence of classification. The training of the model initially includes the addition of question and answer pairs (at 1710) in standardized versions. These questions may be globally applicable questions, industry specific questions, or even unique questions for a given client. For example, the business hours and holidays taken for one business may vary from another business, even within a similar industry and market.

Since questions do not typically take one form, variants of the question may also be populated into the model (at 1720) based upon training sets used to train the question classification model. These multiple question variants are then mapped to the standardized answer (at 1730). This concludes the initial setup of the question recognition process, but it should be noted that as additional training desk feedback is received the models may be updated accordingly.

Next, a message is received that includes a question. The system classifies the question within a hierarchy (at 1740). At the most basic level, the system is able to determine that the message includes a question, but is unsure (low confidence) of the general topic of the question. This may be determined by the presence of a question mark punctuation, or sentence wording order. For example, terms like "do you", "was", "are", "how", "who", "what", "where", "when" and "why" all signify a question. Order of the sentence can likewise signify a question. Generally a statement is ordered as a subject, verb and object. A question, on the other hand, includes a question term, subject, verb and subject.

Beyond merely determining that a question is present, is the ability to determine if the question belongs to a class of questions. For example, a question that mentions cost, price or "how much" something is may all be classified into the 'price' category. These questions may be very different from one another, but are all related in some way to price. For example, the question "how much is the car?" is very different from the question of "is the price negotiable?". If the system is confident that the question is directed to a particular topic, but is not confident of a specific question being asked, the system may classify the question by class. An answer to this could include a response of "Our sales associate will look into this pricing question and respond to you shortly." This answer meets any 'price' related question.

At the most granular level, the system may recognize that a specific question has been asked. This involves the question being sufficiently similar to one of the modeled question variants. When this occurs, the system may respond to the question in a far more specific manner.

Regardless of what level a question is classified at, the classified question maps back to a standard answer (at 1750). For any question asking about business hours, for example, the standard answer could be "we are open 8 to 5 every day." This response may be then altered in a pseudorandom manner to ensure that the same standard answer is not repeatedly used. This avoids situations where the system may appear too "robotic" or artificial. For instance, in our prior example, the answer may be provided as "we are open 8 to 5, daily" in one response, and "our hours of operation are between 8 in the morning and 5 in the evening, every day." The content of these answers is identical, but the phrasing is different and avoids repetition that sounds artificial.

The type of the answer may lend itself to a rapid, standalone response, or may be less urgent. Based upon urgency of the question/answer pair, and the schedule of the next message, the system may decide if the answer should be responded to immediately in a standalone message, or should be incorporated into the next message exchange (at 1760).

Figure 18:
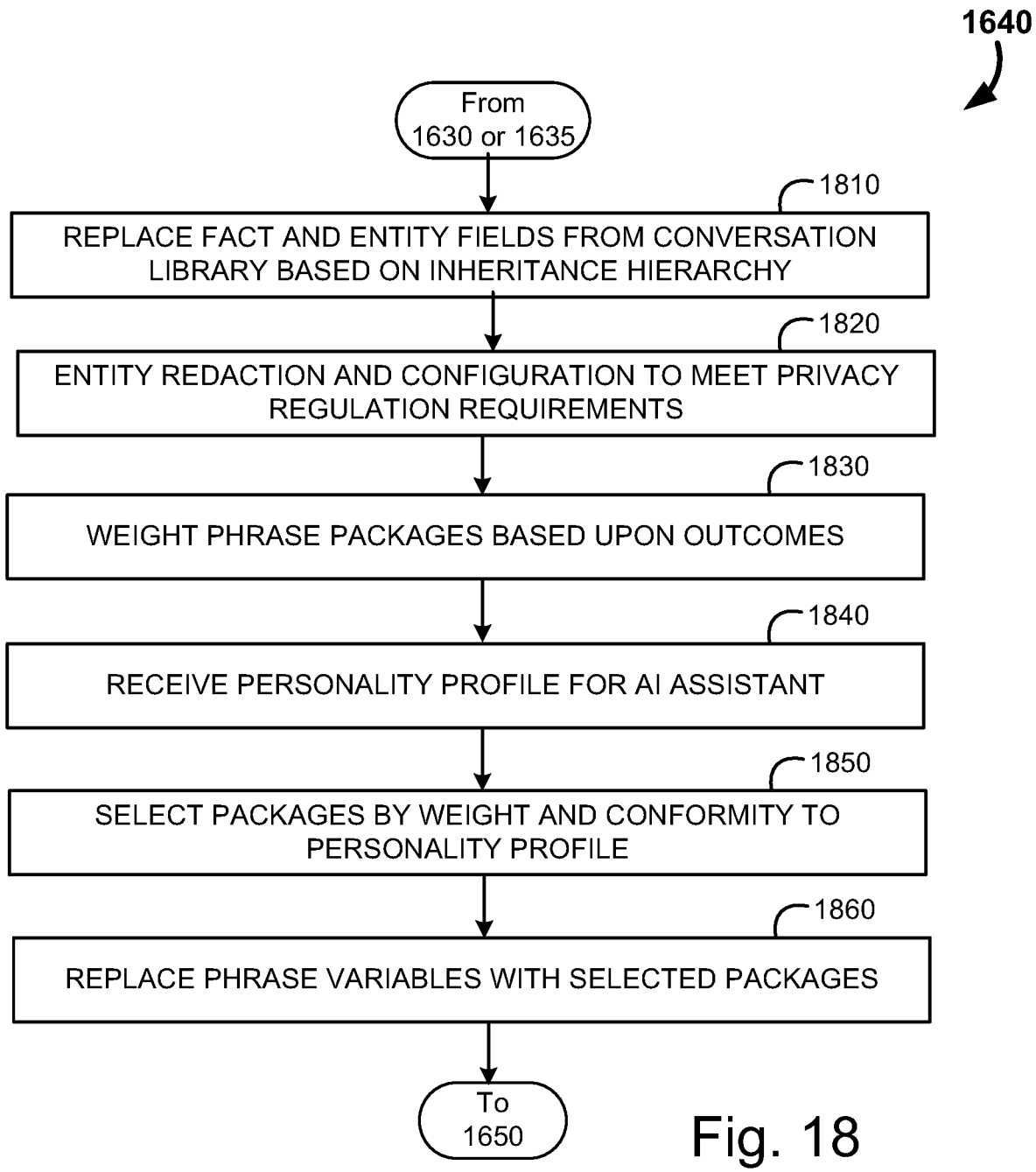
FIG. 18 is an example flow diagram for the process template variable field population, in accordance with some embodiment.

Returning to FIG. 16, once the proper template is identified, the variable fields within the template are populated (at 1640) which is described in greater detail in FIG. 18. Population of the variable fields includes replacement of facts and entity fields from the conversation library based upon an inheritance hierarchy (at 1810). As noted previously, the conversation library is curated and includes specific rules for inheritance along organization levels and degree of access. This results in the insertion of customer/ industry specific values at specific place in the outgoing messages, as well as employing different lexica or jargon for different industries or clients. Wording and structure may also be influenced by defined conversation objectives and/or specific data or properties of the specific target.

At this stage it may be desirable to perform a sub-process for privacy regulation compliance. This includes the redaction and configuration of entities within the message template to remove entity information that runs afoul of any privacy policies or regulations. As noted previously the GDPR imposes fines upon companies which release personally identifiable information. A message that is sent to a training desk, or for which analytics are determined and reported, may violate such a regulation if this kind of information is still present within the response when viewed.

In addition to GDPR, medical and financial regulation exist to protect patients and consumers. Like GDPR, laws such as HIPAA may impose stiff sanctions against organizations that violate these provisions. Depending upon the regulations implicated, different types of entity information may be configured as "sensitive" and any such entity information may be redacted from the document and replaced with class appropriate replacements. For example, the statement of "Hi Mr. Smith, your test results for diabetes were normal" the redacted message could include the following: "Hi [NAME] your test results for [PROCEDURE] were [RESULT]."

While the entity redaction helps with regulation compliance, it is likewise imperative that the base data is not lost. Thus the system may configure these replacement entities to reference back to the original entity information in a configuration file. This configuration file may be encrypted, or otherwise protected from improper access, thereby allowing the system to operate at its full capability while still meeting privacy regulations.

After basic entity and fact replacement and any resulting redaction activity, specific phrases may be selected (at 1830) based upon weighted outcomes (success ranks). The system calculates phrase relevance scores to determine the most relevant phrases given a lead state, sending template, and message component. Some (not all) of the attributes used to describe lead state are: the client, the conversation, the objective (primary versus secondary objective), series in the conversation and attempt number in the series, insights, target language and target variables. For each message component, the builder filters (potentially thousands of) phrases to obtain a set of maximum-relevance candidates. In some embodiments, within this set of maximum-relevance candidates, a single phrase is randomly selected to satisfy a message component. As feedback is collected, phrase selection is impacted by phrase performance over time, as discussed previously. In some embodiments, every phrase selected for an outgoing message is logged. Sent phrases are aggregated into daily windows by Client, Conversation, Series, and Attempt. When a response is received, phrases in the last outgoing message are tagged as 'engaged'. When a positive response triggers another outgoing message, the previous sent phrases are tagged as 'continue'. The following metrics are aggregated into daily windows: total sent, total engaged, total continue, engage ratio, and continue ratio.

To impact message-building, phrase performance must be quantified and calculated for each phrase. This may be performed using the following equation:

$$\text{Phrase performance}$$
$$\text{performance} = \frac{(\text{percent\_engaged} + \text{percent\_continue})}{2} \quad \text{Equation 1}$$

Engagement and continuation percentages are gathered based on messages sent within the last 90 days, or some other predefined history period. Performance calculations enable performance-driven phrase selection. Relative scores within maximum-relevance phrases can be used to calculate a selection distribution in place of random distribution.

Phrase performance can fluctuate significantly when sending volume is low. To minimize error at low sending volumes, a $$\frac{\ln(x)}{x}$$

padding window is applied to augment all phrase-performance scores. The padding is effectively zero when total sent is larger than 1,500 sent messages. This padded performance is performed using the following equation:

Padded performance $$\text{performance\_pad} = 100 \times \frac{\ln(\text{total\_sent} + \text{LN\_OFFSET})}{\text{total\_sent} + \text{ZERO\_OFFSET}} \quad \text{Equation 2}$$

Performance scores are augmented with the performance pad prior to calculating distribution weights using the following equation:

$$\text{performance}' = \text{performance} + \text{augmented phrase performance}$$

As noted, phrase performance may be calculated based on metrics gathered in the last 90 days. That window can change to alter selection behavior. Weighting of metrics may also be based on time. For example, metrics gathered in the last 30 days may be assigned a different weight than metrics gathered in the last 30-60 days. Weighting metrics based on time may affect selection behaviors as well. Phrases can be shared across client, conversation series, attempt, etc. It should be noted that alternate mechanisms for calculating phrase performance are also possible, such as King of the Hill or Reinforcement Learning, deep learning, etc.

Due to the fact that message attempt is correlated with engagement; metrics are gathered per attempt to avoid introducing engagement bias. Additionally, variable values can impact phrase performance; thus, calculating metrics per client is done to avoid introducing variable value bias.

Adding performance calculations to message building increases the amount of time to build a single message. System improvements are required to offset this additional time requirement. These may include caching performance data to minimize redundant database queries, aggregating performance data into windows larger than one day, and aggregating performance values to minimize calculations made at runtime.

In addition to performance-based selection, as discussed above, phrase selection may be influenced by the "personality" of the system for the given conversation. As noted, the users can adjust the strength of various personality traits. This personality profile is received by the system (at 1840). These may include, but are not limited to the following: folksy/educated, down to earth/idealistic, professional/CVSC-18F-US playful, stiff/casual, serious/silly, confident/cautious, prompt/tardy, persistent/flexible, polite/blunt, etc. The user may employ a set of adjustable slider controls to set the personality profile of a given AI identity. As noted before, personality of an AI assistant may not just be set, as discussed above, but may likewise be learned using machine learning techniques that determines what personality traits are desirable to achieve a particular goal, or that generally has more favorable results.

Message phrase packages are constructed to be tone, cadence, and timbre consistent throughout, and are tagged with descriptions of these traits (professional, firm, casual, friendly, etc.), using standard methods from cognitive psychology. Additionally, in some embodiments discussed previously, each phrase may include a matrix of metadata that quantifies the degree a particular phrase applies to each of the traits. The system will then map these traits to the correct set of descriptions of the phrase packages and enable the correct packages. This will allow customers or consultants to more easily get exactly the right Assistant personality (or conversation personality) for their company, particular target, and conversation. This may then be compared to the identity personality profile, and the phrases which are most similar to the personality may be preferentially chosen, in combination with the phrase performance metrics (at 1850). As noted before, a random element may additionally be incorporated in some circumstances to add phrase selection variability and/or continued phrase performance measurement accuracy. After phrase selection, the phrases replace the variables in the template (at 1860). Returning to FIG. 16, the completed templates are then output as a response (at 1650).

Figure 19:
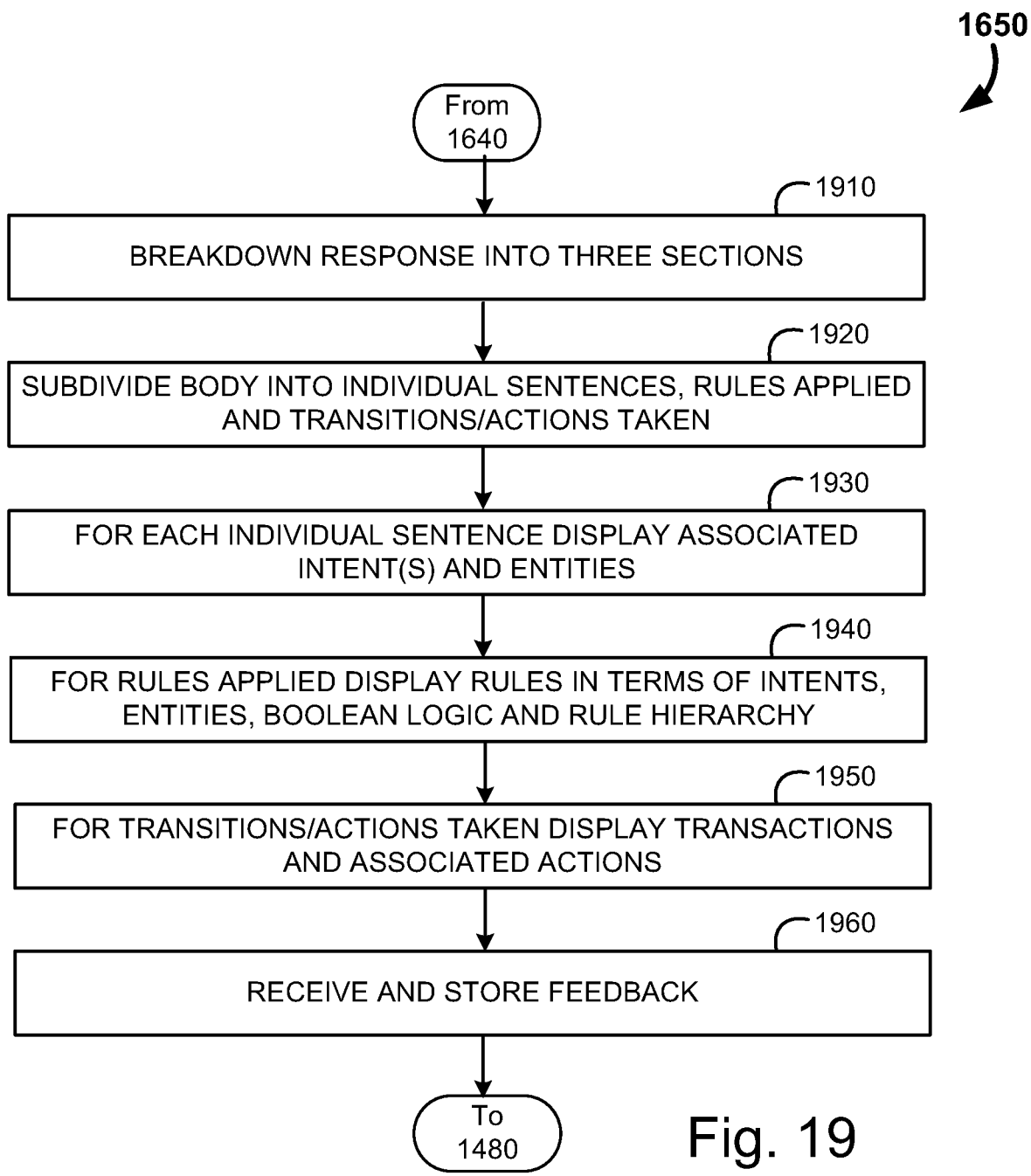
FIG. 19 is an example flow diagram for the process of response outputting, in accordance with some embodiment.

The response output process is shown in greater detail in relation to FIG. 19. Initially the response is broken down into three sections (at 1910). These include the salutation, the body and the signature block. The body is further subdivided into individual sentences (at 1920) for which rules are applied and transitions are taken. For each sentence, the associated entities and intents are displayed (at 1930). Likewise, for the rules that were applied, the rules may be displayed in terms of intents, entities, Boolean logic and rule hierarchies (at 1940).

The transactions taken may be displayed along with the associated actions (at 1950). Feedback regarding this output can be received and stored (at 1960) for improving model training and system accuracy.

Figure 20:
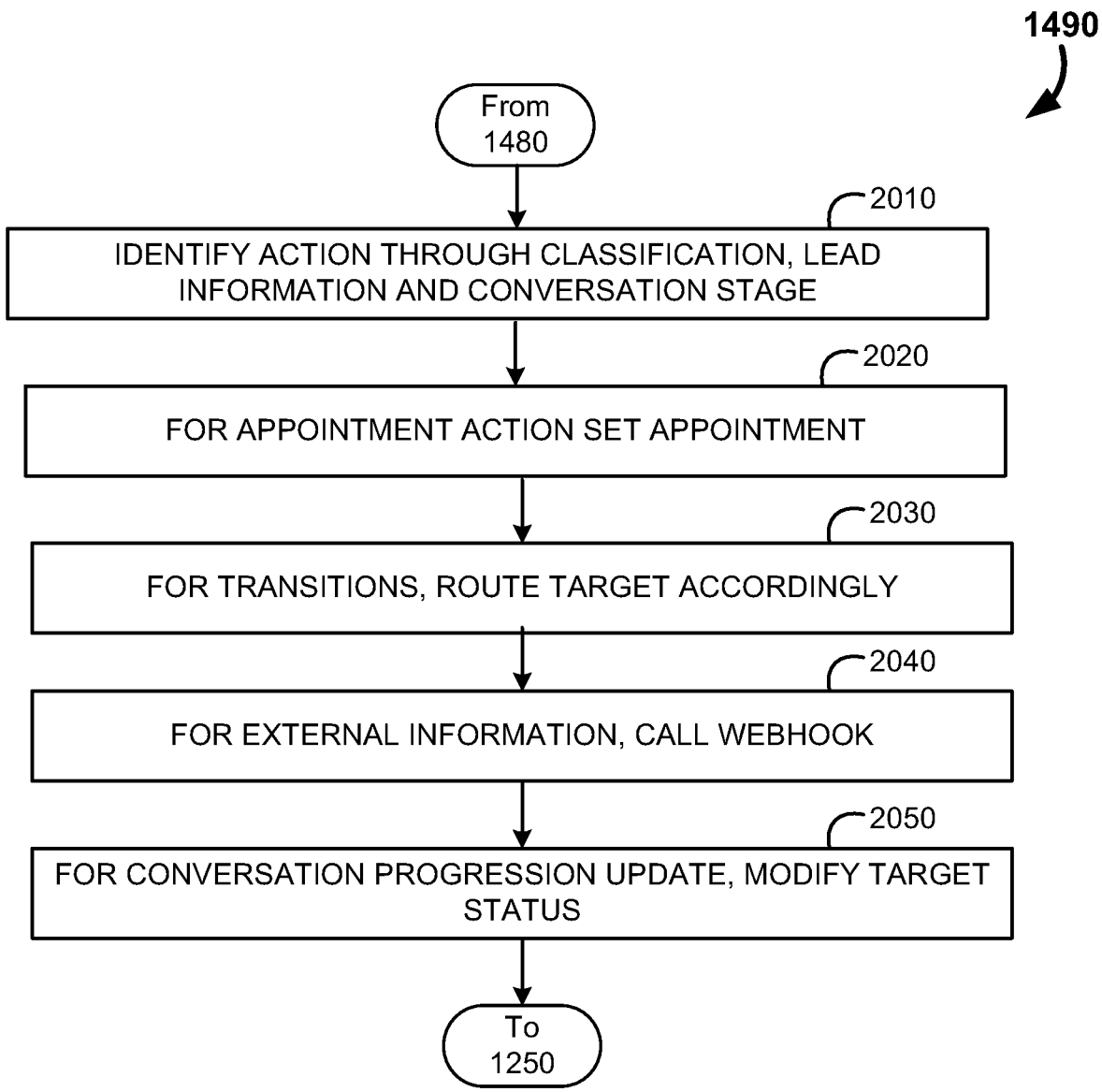
FIG. 20 is an example flow diagram for the process of action execution, in accordance with some embodiment.
Figure 21:
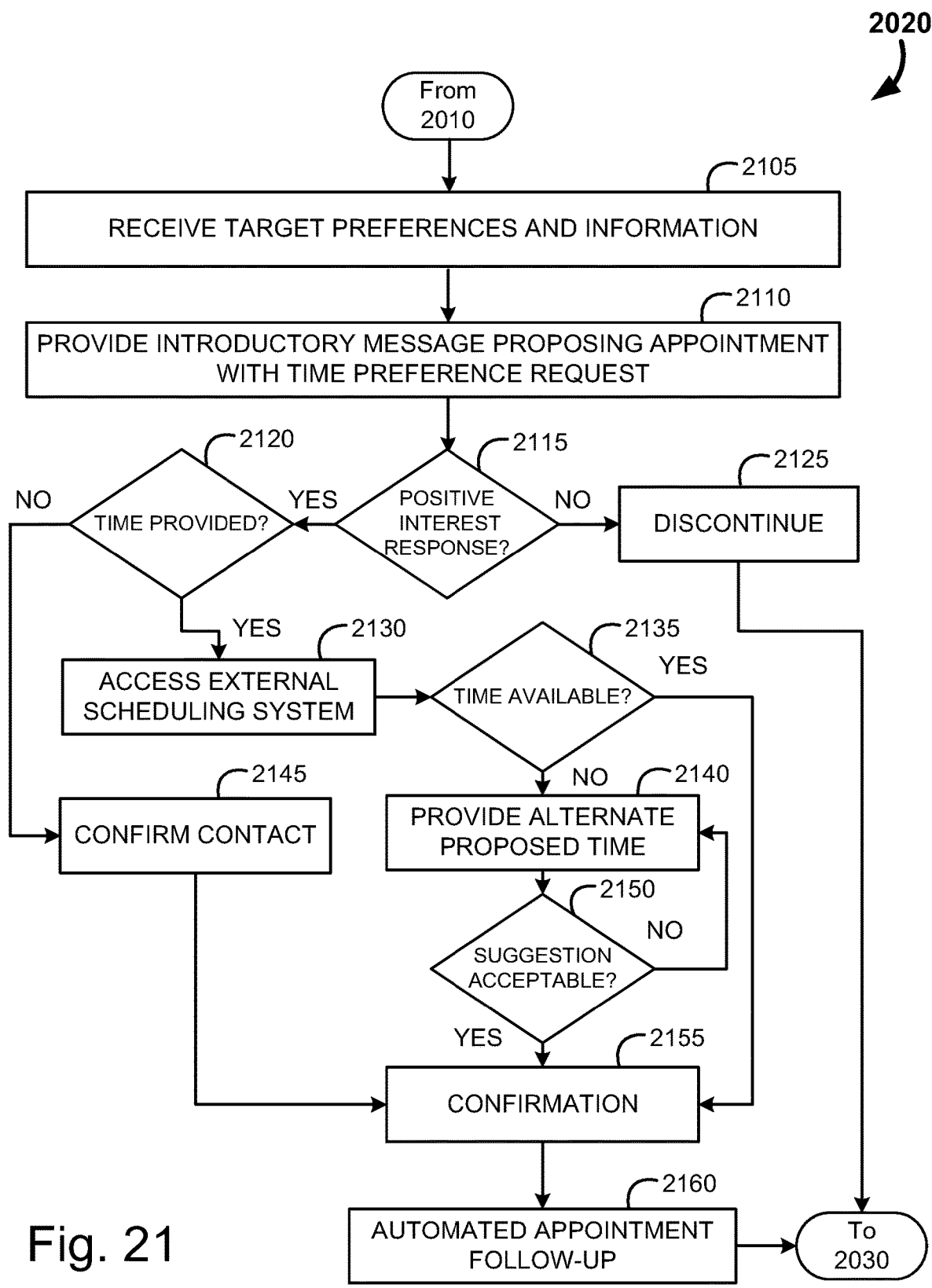
FIG. 21 is an example flow diagram for appointment setting, in accordance with some embodiment.

Returning to FIG. 14, after response generation, an inquiry is made if any additional actions are required (at 1480). If so, then the required action is executed (at 1490). This additional action process is shown in greater detail in relation to FIG. 20. Initially the action to be taken needs to be identified by a triggering phrase, conversation stage, classification, or target information (at 2010). Subsequently, at least one external system associated with the action is accessed and employed to execute the action. One such action that may be taken includes the setting of an appointment (at 2020). FIG. 21 provides a more detailed view of the process for appointment setting and confirmation activity. Initially the target preferences and information is received (at 2105) via the response received from the target. These preferences could include a time or date of a preferred meeting, contact channel preferences, or the like. An introductory message is provided by the system to the target (at 2110). This introduction proposes the concept of having an appointment with the target, taking into consideration any known preferences.

The target then responds to this introductory proposed appointment. An inquiry is made if the target reacts positively to the appointment suggestion (at 2115). If not, the appointment process can be discontinued (at 2125). However, if the response is positive then an additional inquiry is made if the response from the target includes a proposed time for the appointment (at 2120). If not, the system may confirm the contact (at 2145). However, if a time is provided by the target, the system can access and external scheduling system (at 2130). This scheduling system may include a calendar program with access sockets or other API access mechanism, or may include a CRM program or the like.

The system checks the scheduling system for availability of the time slot (at 2135). This may be performed on an individual user level (for example when the AI assistant is providing scheduling and appointment assistance for a particular individual), or may perform a check for schedule availability for a selected group of individuals. For example, if the target is a potential customer for a new automobile, and the AI system is being deployed on behalf of a car dealership, the AI system may check the dealer's CRM system to determine if any sales associate is available for the proposed time. The dealer is unconcerned which exactly who the potential customer is meeting with, since a sale is the objective regardless of who completes the sale. In contrast, for a realtor, the AI system may need to schedule meetings at a given property with a specific listing agent. Client specific rules may be employed to determine which schedules are reviewed when setting a new appointment.

If the time is available within the scheduling system, a confirmation may be generated and sent to both the target and the person for whom the appointment is made (at 2155). Additional follow-up confirmations may be likewise generated in a configurable manner. For example, upon appointment formation the system could be configured to send a confirmation immediately to the target alone, and 48 hours before the appointment send a second confirmation to both the target and person the target will be meeting with. If the appointment is scheduled within 48 hours, in this particular example, the confirmation will immediately be sent to both parties. In some embodiments, the timing, frequency and manner of reminder confirmations may be configurable by the client. For the realtor example provided before, the agent may wish to be notified by email 72 hours before an appointment (so that they can make sure they are available on the needed day), a follow-up reminder email the day before the appointment, and a final reminder 30 prior to the appointment via text message. Notification/confirmation with both the target and the person they are to meet is necessary when setting appointments. This is due to the fact that the system is arranging the appointments on behalf of someone, without any knowledge of the event. Unless the person for whom the AI system is operating on the behalf of is very diligent with continually checking their calendar, any appointments set without their knowledge will be missed, barring a notification.

If, however, the suggested time by the target was not available in the scheduling system, the AI will instead select a different time for an appointment that falls within the available time (adhering to business hours, availability, etc.), and this alternate time is provided to the target (at 2140). In some embodiments, the proposed time will be made as close to the original time proposed by the target as is reasonably possible. The target responds to the proposed time, and a check is made to see if the target finds the proposition acceptable (at 2150). If not the process may repeat with a new proposed time until the target declines entirely, provides their own time suggestion that works, or finds the newly suggested time acceptable. After which the process continues with the aforementioned confirmation process.

After appointment confirmation, automated follow-up actions may be undertaken if needed (at 2160). For example, if the target contacts the system and needs to change or cancel the appointment, the system may update the appointment schedule accordingly. This may include suggesting a time for a rescheduled appointment, or rechecking the schedule based upon a suggestion by the target, and undergoing the same sort of negotiation until a mutually agreeable time is found. Likewise, schedules for the person meeting with the target may change due to illness, someone missing a shift, natural disaster, or other event. In such situations, the appointment setting AI system may re-contact the target and apologize for the change in plans (using an apology conversation template). The AI system may likewise then reenter the negotiation process for finding a new time to meet (if possible). Of course additional follow-up actions may also be possible. For example, it may be desirable to send the target a survey request soon after the appointment occurs, or a thank you message following the appointment.

Returning to FIG. 20, another action that may be undertaken by the system includes automated target routing based upon state transitions of the conversation (at 2030). This could include utilizing an upsell conversation that can also gather additional qualifying information from the target, by asking a qualifying question in the second (or later) series of the conversation. This qualifying question helps larger clients determine where the target should be routed based on their interest and requested services. This information may be leveraged to create an upsell discovery conversation that is designed similar to inbound discovery, it would be incredibly useful to larger clients with more complex services and upgrade options. Likewise, even if upselling conversation is not desired, when the target has a transition change in the conversation, the next message sent in the series should flow accordingly. The routing can ensure that in the branched flow of a possible conversation the target is properly routed to the needed next series in the conversation process. Other transaction actions may include going to a new exchange, to another conversation, altering of the status of the target, sending alerts or updating contact information for the target.

Other actions may include the calling of one or more webhooks (at 2040). A webhook alters the activity of a web application with a custom callback. These callbacks may be maintained and managed by a third party from the AI system. Generally this consists of an HTTP request to the URL configured for the webhook based upon a predefined triggering event.

Figure 22:
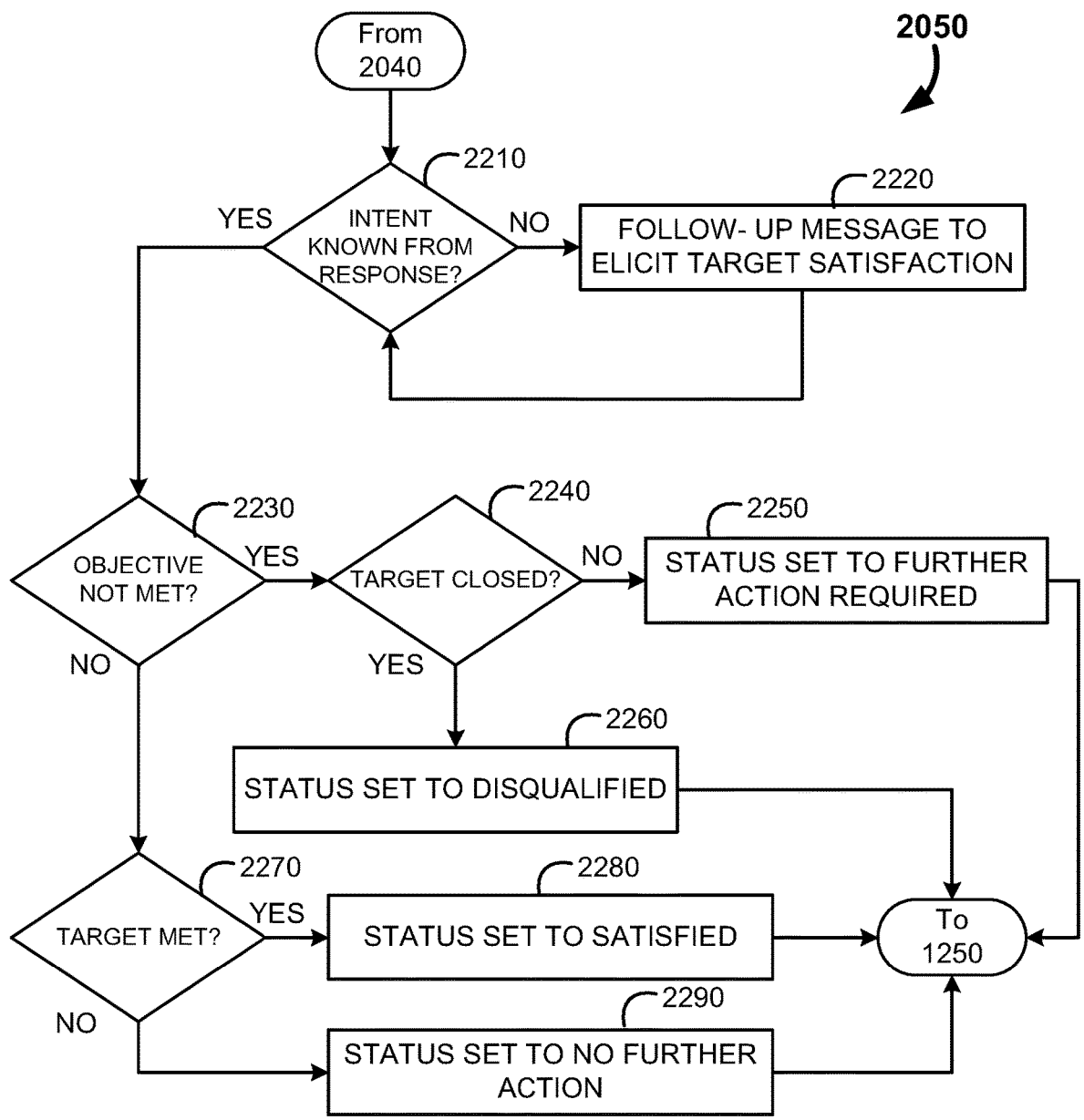
FIG. 22 is an example flow diagram for the process of status updating, in accordance with some embodiment.

Lastly, an action may consist of flagging a transition as a reportable event (not illustrated), and modifying the progression status of a target in a conversation (at 2050). For example, negative feedback from the target may cause the system to update to a 'stop messaging' status, or an 'unsubscribe' status. FIG. 22 provides a more detailed process for one possible embodiment of status updating in a sales context. In this example process, an inquiry is made if the intent is known from the target's response (at 2210). If not a follow-up message designed to elicit if the target is satisfied may be sent (at 2220). This may be repeated a set number of times with differing variants to attempt to receive further intent information from the target. Once the intent is known another inquiry may be made to see if the business objective has been met (at 2230). For this sales example, the business objective could include meeting with the target for a sales pitch, for example. If so, an additional inquiry may be made to determine if the target is available to meet this objective, or is no longer able or willing to meet the objective (at 2240). If so, the status of the target may be updated to 'disqualified' (at 2260). Alternatively, the target may be set to a status of 'further action required' (at 2250), since the objective has not been met, but could be completed with the target potentially.

If however the objective has been met, or it is unclear if the objective has not been met, or the objective is in the process of being accomplished, an inquiry is made if the target's needs have already been met (at 2270). If so, then the target is getting what they need and it is in furtherance of the objective, so the status for the target may be updated as 'satisfied' (at 2280). If the target's needs are not yet met, but the business objective is on track, the system sets the status to 'no further action' (at 2290).

In our sales example, a potential customer who indicates they purchased the offered service from another business would be set as disqualified. A customer indicating they have been unable to meet with a sales representative would be set to further action required. A customer who has set up a meeting with a sales representative would be deemed as satisfied, while a customer that says they spoke with someone and is "all set" or a similar dismissal, would be labeled as requiring no further action.

Returning all the way back to FIG. 12, after the actions are generated, a determination is made whether there is an action conflict (at 1250). Manual review may be needed when such a conflict exists (at 1270). Otherwise, the actions may be executed by the system (at 1260).

Returning then to FIG. 10, after the response has been processed, a determination is made whether to deactivate the target (at 1075). Such a deactivation may be determined as needed when the target requests it. If so, then the target is deactivated (at 1090). If not, the process continues by determining if the conversation for the given target is complete (at 1080). The conversation may be completed when all objectives for the target have been met, or when there are no longer messages in the series that are applicable to the given target. Once the conversation is completed, the target may likewise be deactivated (at 1090).

However, if the conversation is not yet complete, the process may return to the delay period (at 1020) before preparing and sending out the next message in the series (at 1030). The process iterates in this manner until the target requests deactivation, or until all objectives are met. This concludes the main process for a comprehensive messaging conversation.

Figure 23:
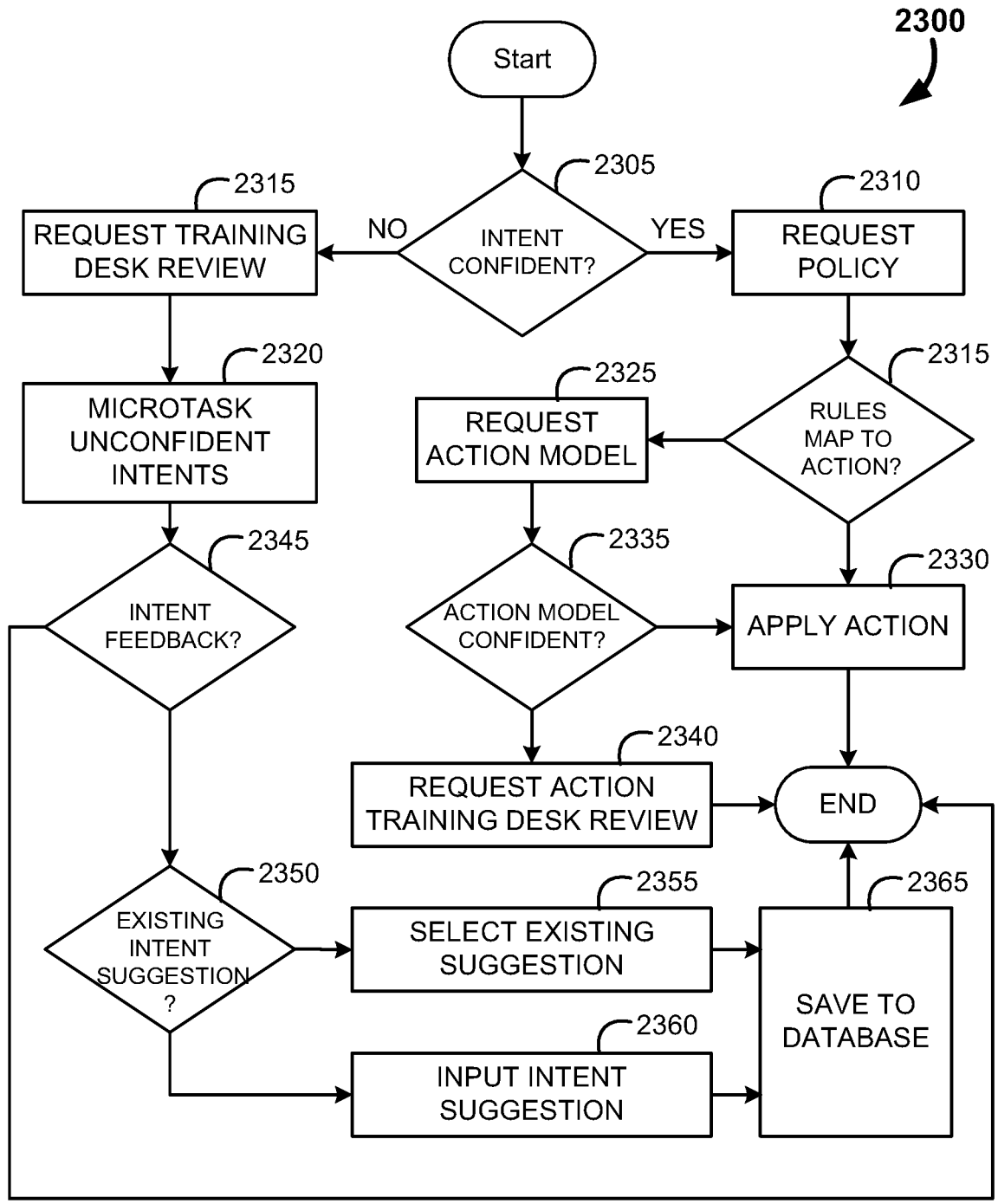
FIG. 23 is an example flow diagram for the process of training desk involvement, in accordance with some embodiment.

Turning now to FIG. 23 an example flow diagram for the process of training desk involvement is provided, shown generally at 2300. This process starts with an inquiry if the intent of a response can be confidently determined during classification (at 2305). If so, a policy may be requested (at 2310) for the intent. An inquiry is made if actions have already been mapped (at 2315) in the received policy. If so, the action may be applied (at 2330). However if there is no mapped action, an action model may be requested (at 2325). If the model is confident in the action (at 2335) the action may be taken (at 2330). In all other circumstances human intervention through the training desk may be required for proper conversation handling and for improving model accuracy.

For example, if the initial intent was not confidently classified, the training desk may be requested to review the conversation exchange (at 2315). Any unconfident intents may be microtasked (at 2320) for review by the training desk user. If the training desk is able to provide intent feedback (at 2345), an additional inquiry may be made if the intent already exists in the system or is a new intent (at 2350). If the intent already exists, the training desk user may select this intent from a pull down menu of existing suggestions (at 2355). Otherwise, if the intent is new, the user may directly input the new intent suggestion (at 2360). Regardless of whether the intent is selected from existing ones, or is newly generated, the intent and input leading to this intent are saved to a database for subsequent machine learned model training (at 2365).

Likewise, if the action model was not confident (at 2335), the training desk user may again be leveraged to determine the proper action given the classified intent (at 2340). Again, training desk feedback may be utilized to improve model accuracy moving forward.

III. System Embodiments

Figure 24A:
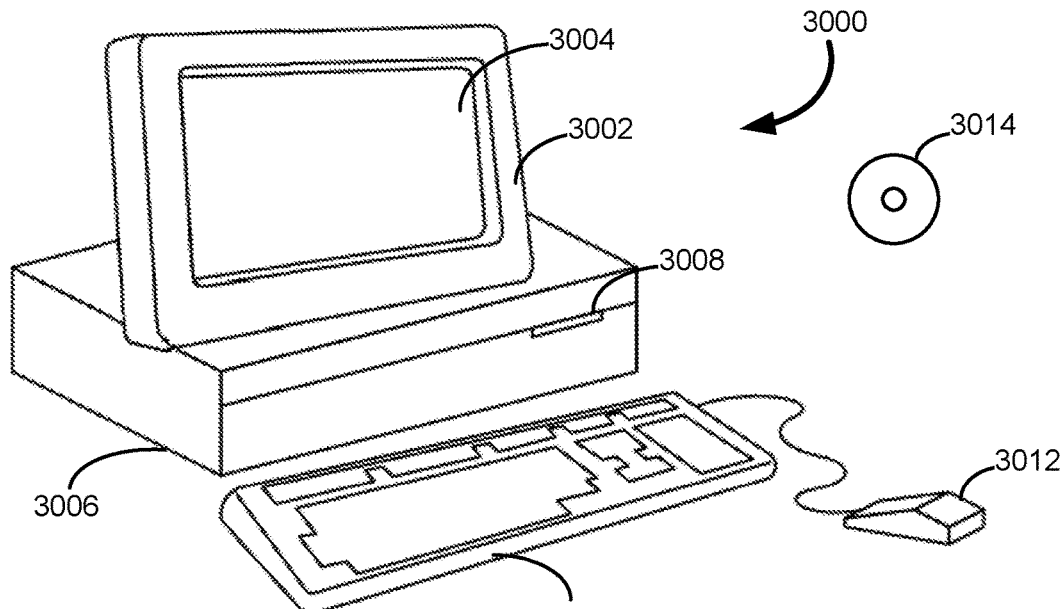
FIGS. 24A and 24B are example illustrations of a computer system capable of embodying the current invention.
Figure 24B:
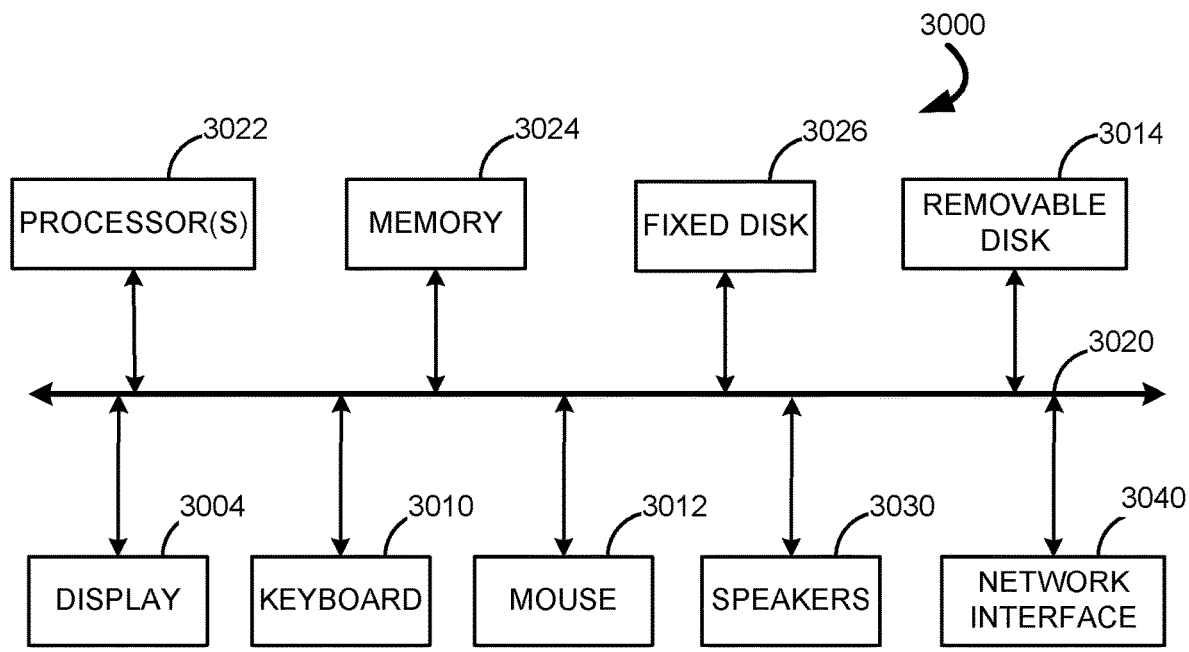

Now that the systems and methods for the conversation generation, dynamic messaging with variable replacements have been described, attention shall now be focused upon systems capable of executing the above functions. To facilitate this discussion, FIGS. 24A and 24B illustrate a Computer System 3000, which is suitable for implementing embodiments of the present invention. FIG. 24A shows one possible physical form of the Computer System 3000. Of course, the Computer System 3000 may have many physical forms ranging from a printed circuit board, an integrated circuit, and a small handheld device up to a huge super computer. Computer system 3000 may include a Monitor 3002, a Display 3004, a Housing 3006, a Disk Drive 3008, a Keyboard 3010, and a Mouse 3012. Disk 3014 is a computer-readable medium used to transfer data to and from Computer System 3000.

FIG. 24B is an example of a block diagram for Computer System 3000. Attached to System Bus 3020 are a wide variety of subsystems. Processor(s) 3022 (also referred to as central processing units, or CPUs) are coupled to storage devices, including Memory 3024. Memory 3024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 3026 may also be coupled bi-directionally to the Processor 3022; it provides additional data storage capacity and may also include any of the computer-readable media described below. Fixed Disk 3026 may be used to store programs, data, and the like and is typically a secondary storage medium (such as a hard disk) that is slower than primary storage. It will be appreciated that the information retained within Fixed Disk 3026 may, in appropriate cases, be incorporated in standard fashion as virtual memory in Memory 3024. Removable Disk 3014 may take the form of any of the computer-readable media described below.

Processor 3022 is also coupled to a variety of input/output devices, such as Display 3004, Keyboard 3010, Mouse 3012 and Speakers 3030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 3022 optionally may be coupled to another computer or telecommunications network using Network Interface 3040. With such a Network Interface 3040, it is contemplated that the Processor 3022 might receive information from the network or might output information to the network in the course of performing the above-described dynamic messaging processes. Furthermore, method embodiments of the present invention may execute solely upon Processor 3022 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 3000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for automated appointment scheduling used in a conversation between a target and an Artificial Intelligence (AI) messaging system comprising:
   generating an introductory message proposing an appointment with the target with a request for timing;
   receiving a response from the target;
   processing the response for positive interest and the presence of a proposed time;
   discontinuing the messaging when positive interest is absent;
   accessing an external scheduling system when a proposed time is present, wherein the accessing determines availability of at least one resource at the proposed time;
   iteratively providing suggested times close to the proposed time when the at least one resource is not available;
   confirming an appointment when the at least one resource is available for any of the proposed time or one of the suggested times; and
   presenting as output of the AI messaging system as a dashboard for end-users, wherein the dashboard explains how the AI messaging system makes decisions, and further allows companies using the AI messaging system to fine-tune the behavior of their AI assistant.

2. The method of claim 1, wherein the output of the AI messaging system is extended to a feature that allows users to directly teach their assistant new ways of conversing with prospects.

3. The method of claim 1, further comprising following up with the target after the appointment.

4. The method of claim 3, wherein the following up includes confirming the appointment occurred.

5. The method of claim 4, further comprising resetting the appointment when it has not occurred.

6. The method of claim 3, wherein the following up includes determining appointment outcome.

7. The method of claim 6, wherein the outcome is stored for metrics reporting.

8. The method of claim 6, wherein the outcome triggers a maintenance action after a predefined time period.

9. The method of claim 1, further comprising confirming contact with the target when no proposed time is present.

10. A computer implemented method for automated appointment scheduling used in a conversation between a target and an Artificial Intelligence (AI) messaging system comprising:
   generating an introductory message proposing an appointment with the target with a request for timing;
   receiving a response from the target;
   processing the response for positive interest and the presence of a proposed time;
   discontinuing the messaging when positive interest is absent;
   accessing an external scheduling system when a proposed time is present, wherein the accessing determines availability of at least one resource at the proposed time;
   iteratively providing suggested times close to the proposed time when the at least one resource is not available;
   confirming an appointment when the at least one resource is available for any of the proposed time or one of the suggested times; and
   presenting output of the AI messaging system as a dashboard for end-users, wherein the dashboard explains how the AI messaging system makes decisions, and further allows companies using the AI messaging system to fine-tune the behavior of their AI assistant, and wherein the output of the AI messaging system is extended to a feature that allows users to directly teach their assistant new ways of conversing with prospects.

11. A computer implemented method for automated appointment scheduling used in a conversation between a target and an Artificial Intelligence (AI) messaging system comprising:
   generating an introductory message proposing an appointment with the target with a request for timing;
   receiving a response from the target;
   processing the response for positive interest and the presence of a proposed time;
   discontinuing the messaging when positive interest is absent;
   accessing an external scheduling system when a proposed time is present, wherein the accessing determines availability of at least one resource at the proposed time;
   iteratively providing suggested times close to the proposed time when the at least one resource is not available;
   confirming an appointment when the at least one resource is available for any of the proposed time or one of the suggested times; and
   following up with the target after the appointment, wherein the following up includes determining appointment outcome, and wherein the outcome triggers a maintenance action after a predefined time period.

* * * * *